United States Patent
Sommerlade et al.

(10) Patent No.: US 10,865,219 B2
(45) Date of Patent: Dec. 15, 2020

(54) PROCESS FOR THE PREPARATION OF BIS(ACYL)PHOSPINIC ACID SYLYL ESTERS

(71) Applicant: IGM GROUP B.V., Waalwijk (NL)

(72) Inventors: Reinhard H. Sommerlade, Neuenburg am Rhein (DE); Kai Uwe Luckner, Inzlingen (DE)

(73) Assignee: Borealis AG

( * ) Notice: Subject to any disclaimer, the term of this patent is extended or adjusted under 35 U.S.C. 154(b) by 0 days.

(21) Appl. No.: 16/621,163

(22) PCT Filed: Jun. 27, 2018

(86) PCT No.: PCT/EP2018/067278
§ 371 (c)(1),
(2) Date: Dec. 10, 2019

(87) PCT Pub. No.: WO2019/002383
PCT Pub. Date: Jan. 3, 2019

(65) Prior Publication Data
US 2020/0115403 A1  Apr. 16, 2020

(30) Foreign Application Priority Data

Jun. 27, 2017 (EP) .................................. 17178112

(51) Int. Cl.
C07F 9/50      (2006.01)
(52) U.S. Cl.
CPC .................... C07F 9/5086 (2013.01)
(58) Field of Classification Search
CPC ...................................................... C07F 9/5086
See application file for complete search history.

(56) References Cited

U.S. PATENT DOCUMENTS

2007/0240609 A1* 10/2007 Husler ............... C07D 295/112
106/31.97

FOREIGN PATENT DOCUMENTS

| DE | 243500 A1 * | 3/1987 | | |
|---|---|---|---|---|
| WO | 2004/099262 A1 | 11/2004 | | |
| WO | 2012/012067 A1 | 1/2012 | | |
| WO | 2014/095724 A1 | 6/2014 | | |
| WO | WO-2014095724 A1 * | 6/2014 | ............. | G03F 7/029 |

OTHER PUBLICATIONS

CAS Abstact DD 243500 (1987) (Year: 1987).*
Rondarenko, et al., "Synthesis of Phosphorus-Containing Carboxylic Acids Based on Bis (Trimethylsil yl)Hypophosphite", Phosphorus, Sulfur, and Silicon, I991, vol. 56, pp. 179-182.
Laskorin, et al., "Effect of the structure of aromnatic organophosphorus acids on their extraction properties", STN CA Caesar accession No. 1153, Radiokhimiya (1971), 13(6), pp. 809-815, abstract.
Muller et al., "Simple One-Pot Syntheses of Water-soluble Bis(acyl)phosPhane Oxide Photoinitiators and Their Application in Surfactant-Free Emulsion Polymerization", Macromol Rapid Commun., 2015, 36, pp. 553-557.

* cited by examiner

Primary Examiner — Alexander R Pagano
(74) Attorney, Agent, or Firm — Tarolli, Sundheim, Covell & Tummino LLP

(57) ABSTRACT

The present invention refers to a process for the preparation of a bis(acyl)phosphinic acid silyl ester of the general formula (I), wherein $R_1$, $R_2$, $R_3$, $R_4$, $R_5$, $R_7$, $R_8$, $R_9$, $R_{10}$ and $R_{11}$ are the same or different and are independently selected from H, halogen, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl, $C_6$-$C_{12}$-aryl, $C_3$-$C_8$-cycloalkoxy, $C_7$-$C_{12}$-arylalkoxy, $C_9$-$C_{15}$-alkenylarylalkoxy, nitro-, $C_6$-$C_{12}$-arylsulfonyl, 4-alkylarylsulfonyl, $C_1$-$C_{20}$-alkylcarboxy, $C_1$-$C_8$-alkoxycarbonyl, $SR_{12}$, $NHR_{12}$ or $NR_{12}R_{13}$ with $R_{12}$ and $R_{13}$ being independently selected from H, linear or branched $C_1$-$C_{20}$-alkyl, linear or branched $C_2$-$C_8$-alkenyl and $C_3$-$C_8$-cycloalkyl, and an O-, S- or N-containing 5- or 6-membered heterocyclic ring; $R_6$ is $OSiR_{14}R_{15}R_{16}$ with $R_{14}$, $R_{15}$ and $R_{16}$ being independently selected from linear or branched $C_1$-$C_{20}$-alkyl or $C_6$-$C_{12}$-aryl; as well as the bis(acyl)phosphinic acid silyl ester and the bis(acyl)phosphinic acid obtained by the process.

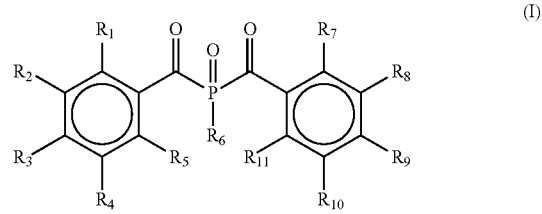

(I)

15 Claims, No Drawings

PROCESS FOR THE PREPARATION OF BIS(ACYL)PHOSPINIC ACID SYLYL ESTERS

FIELD OF THE INVENTION

The present invention refers to a process for the preparation of a bis(acyl)phosphinic acid silyl ester of the general formula I,

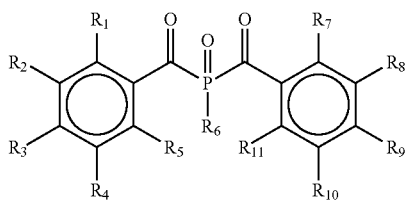

wherein $R_1$, $R_2$, $R_3$, $R_4$, $R_5$, $R_7$, $R_8$, $R_9$, $R_{10}$ and $R_{11}$ are the same or different and are independently selected from H, halogen, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl, $C_6$-$C_{12}$-aryl, $C_3$-$C_8$-cycloalkoxy, $C_7$-$C_{12}$-arylalkoxy, $C_9$-$C_{15}$-alkenylarylalkoxy, nitro-, $C_6$-$C_{12}$-arylsulfonyl, 4-alkylarylsulfonyl, $C_1$-$C_{20}$-alkylcarboxy, $C_1$-$C_8$-alkoxycarbonyl, $SR_{12}$, $NHR_{12}$ or $NR_{12}R_{13}$ with $R_{12}$ and $R_{13}$ being independently selected from H, linear or branched $C_1$-$C_{20}$-alkyl, linear or branched $C_2$-$C_8$-alkenyl and $C_3$-$C_8$-cycloalkyl, and an O-, S- or N-containing 5- or 6-membered heterocyclic ring; $R_6$ is $OSiR_{14}R_{15}R_{16}$ with $R_{14}$, $R_{15}$ and $R_{16}$ being independently selected from linear or branched $C_1$-$C_{20}$-alkyl or $C_6$-$C_{12}$-aryl; as well as the bis(acyl)phosphinic acid silyl ester and the bis(acyl)phosphinic acid obtained by the process.

BACKGROUND OF THE INVENTION

Bis(acyl)phosphine oxides (BAPOs) are well established and are extremely efficient photoinitiators for the industrial curing of pigmented or clear coatings, adhesives, inks, photoresists, printing plates, and dental applications. The most prominent commercial product of this class is Omnirad 819, bis(2,4,6-trimethylbenzoyl)-phenylphosphine oxide, formerly known as Irgacure 819.

Since long, there is a high demand for liquid and/or water soluble BAPOs. Many efforts have been undertaken to get to such compounds, most of the processes consist expensive or laborious procedures. For example, WO 2012/012067 A1 discloses the synthesis of alkyl bis(mesitoyl)phosphinates starting from dialkyl hydrogen phosphites. Only n-butyl bis(2,4,6-trimethylbenzoyl)phosphinate was given as an example but without any information on yield or product properties. It is to be noted that the example could not be reproduced in the applicant's lab and does not seem to be reliable.

A water-compatible form of Irgacure 819 is available as a water dispersion but a stable BAPO solution in water is not yet available on the market. Such formulations are highly desirable for potential ink-jet and LED applications. In WO 2014095724 A1, and G. Müller, M. Zalibera, G. Gescheidt, A. Rosenthal, G. Santiso-Quinones, K. Dietliker, and H. Grützmacher, Macromol. Rapid Commun. 2015, 36, 553, a synthetic procedure for a water-soluble BAPO derivative, the so-called BAPO—OH (bis(mesitoyl)phosphinic acid), is described. Many interesting photoactive derivatives, including lithium, sodium, potassium and ammonium salts as well as other water-soluble organic derivatives can be synthesized starting from the parent compound. However, the only known synthetic procedure for BAPO—OH suffers from severe limitations, rendering its synthesis costly, inconvenient or time-consuming. More precisely, the synthesis method for BAPO—OH makes use of metalation of white or red phosphorus or halogen-metal exchange of phosphorus trichloride. Even though the reaction proceeds with good to moderate yield, handling of white phosphorus is extremely dangerous due to its physical and toxicological properties. When starting from red phosphorus or phosphorus trichloride, the yields are significantly lower. A complexing solvent is imperative, causing extra costs compared to standard solvents. In addition, an alkali metal is required, thus necessitating the corresponding special equipment for industrial scale production.

Therefore, there is a continuous need in the art for providing a process for the preparation of bis(acyl)phosphinic acids. Furthermore, it is desirable to provide a process for the preparation of an intermediate compound which avoids elaborate processing steps for obtaining the desired bis(acyl)phosphinic acids. Furthermore, it is desirable that the intermediate product can be easily prepared. In addition thereto, it is desirable to provide a process for the preparation of bis(acyl)phosphinic acids which avoids the use of metallic sodium or lithium in combination with undesirable phosphorus compounds such as an allotrope of phosphorus, e.g. white or red phosphorus, phosphorus trichloride, alkyl or aryl phosphine, or dialkyl or diaryl phosphine because of their volatility, bad smell, toxicity and susceptibility to air and fire. Furthermore, it is desirable to provide a process which allows for the preparation of bis(acyl)phosphinic acids which are not easily prepared by the processes of the prior art.

Accordingly, it is an object of the present invention to provide a process for the preparation of a compound which can be further converted into bis(acyl)phosphinic acids. It is an even further object of the present invention to provide a process for the preparation of this intermediate product and the bis(acyl)phosphinic acid without elaborate processing steps for obtaining the compounds. It is an even further object of the present invention to provide a process for the preparation of bis(acyl)phosphinic acids which avoids the use of metallic sodium or lithium in combination with undesirable phosphorus compounds such as white phosphorus, red phosphorus, phosphorus trichloride, alkyl or aryl phosphine, or dialkyl or diaryl phosphine. It is another object of the present invention to provide a process which allows for the preparation of bis(acyl)-phosphinic acids which are not easily prepared by the processes of the prior art.

SUMMARY OF THE INVENTION

The foregoing and other objects are solved by the subject-matter of the present invention.

According to a first aspect of the present invention, a process for the preparation of a bis(acyl)phosphinic acid silyl ester of the general formula I is provided,

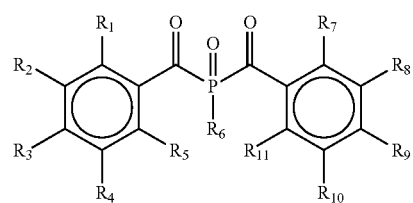

wherein $R_1$, $R_2$, $R_3$, $R_4$, $R_5$, $R_7$, $R_8$, $R_9$, $R_{10}$ and $R_{11}$ are the same or different and are independently selected from H, halogen, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl, $C_6$-$C_{12}$-aryl, $C_3$-$C_8$-cycloalkoxy, $C_7$-$C_{12}$-arylalkoxy, $C_9$-$C_{15}$-alkenylarylalkoxy, nitro-, $C_6$-$C_{12}$-arylsulfonyl, 4-alkylarylsulfonyl, $C_1$-$C_{20}$-alkylcarboxy, $C_1$-$C_8$-alkoxycarbonyl, $SR_{12}$, $NHR_{12}$ or $NR_{12}R_{13}$ with $R_{12}$ and $R_{13}$ being independently selected from H, linear or branched $C_1$-$C_{20}$-alkyl, linear or branched $C_2$-$C_8$-alkenyl and $C_3$-$C_8$-cycloalkyl, and an O-, S- or N-containing 5- or 6-membered heterocyclic ring; $R_6$ is $OSiR_{14}R_{15}R_{16}$ with $R_{14}$, $R_{15}$ and $R_{16}$ being independently selected from linear or branched $C_1$-$C_{20}$-alkyl or $C_6$-$C_{12}$-aryl, the process comprising the steps of a) heating ammonium hypophosphite with a silylating agent for obtaining a bis(silyl ether)phosphine, and
b) reacting the bis(silyl ether)phosphine obtained in step a) with a compound of the general formula IIa and/or IIb,

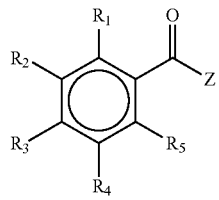

IIa

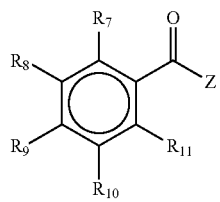

IIb wherein $R_1$, $R_2$, $R_3$, $R_4$ and $R_5$ and/or $R_7$, $R_8$, $R_9$, $R_{10}$ and $R_{11}$ are as defined above; Z is halogen.

The inventors surprisingly found out that such a process is suitable for the preparation of a bis(acyl)phosphinic acid silyl ester which can be easily converted into bis(acyl)phosphinic acids and avoids elaborate processing steps for obtaining the bis(acyl)phosphinic acid silyl ester and the desired bis(acyl)phosphinic acids. Furthermore, the process allows the preparation of the bis(acyl)phosphinic acids without the use of metallic sodium or lithium in combination with undesirable phosphorus compounds such as white phosphorus, red phosphorus, phosphorus trichloride, alkyl or aryl phosphine, or dialkyl or diaryl phosphine. In addition thereto, the process allows the preparation of bis(acyl)phosphinic acids which are not easily accessible by the processes of the prior art.

Advantageous embodiments of the inventive process are defined in the corresponding sub-claims.

According to one embodiment, $R_1$, $R_3$ and $R_5$ and/or $R_7$, $R_9$ and $R_{11}$ are the same.

According to another embodiment, $R_1$, $R_3$ and $R_5$ and/or $R_7$, $R_9$ and $R_{11}$ are the same and are selected from linear or branched $C_1$-$C_{20}$-alkyl, preferably linear or branched $C_1$-$C_{18}$-alkyl, more preferably linear or branched $C_1$-$C_{12}$-alkyl and most preferably linear $C_1$-$C_8$-alkyl.

According to yet another embodiment, $R_2$ and $R_4$ and/or $R_8$ and $R_{10}$ are the same, preferably $R_2$ and $R_4$ and/or $R_8$ and $R_{10}$ are different from $R_1$, $R_3$ and $R_5$ and/or $R_7$, $R_9$ and $R_{11}$.

According to one embodiment, $R_2$ and $R_4$ and/or $R_8$ and $R_{10}$ are the same and are H.

According to another embodiment, Z is selected from chloro, bromo and iodo, preferably chloro.

According to yet another embodiment, step a) is carried out under an inert gas atmosphere and/or without the addition of a solvent.

According to one embodiment, the bis(silyl ether)phosphine obtained in step a) is mixed with an organic solvent, preferably an aprotic organic solvent, before process step b) is carried out.

According to another embodiment, the bis(silyl ether)phosphine obtained in step a) is subjected to process step b) without purification and isolation of the silylated product obtained in step a)

According to yet another embodiment, step a) is carried out at a temperature in the range from 100 to 130° C., preferably in the range from 105 to 125° C. and most preferably in the range from 110 to 120° C. and/or step b) is carried out at a temperature in the range from −78 to +50° C., preferably in the range from 0 to 40° C., more preferably in the range from 0 to 30° C., and most preferably in the range from 0 to 25° C.

According to one embodiment, step b) is carried out in that the equivalent weight ratio of the compound of the general formula IIa and/or IIb to the ammonium hypophosphite of step a) [IIa and/or IIb:P-compound] is in the range from 3.5:1 to 1.5:1 and preferably in the range from 2.5:1 to 1.8:1.

According to another embodiment, process step a) and/or step b) is repeated one or more times.

According to yet another embodiment, the process comprises a further step c) of hydrolyzing the bis(acyl)phosphinic acid silyl ester obtained in step b) such as to obtain a bis(acyl)phosphinic acid of the general formula III

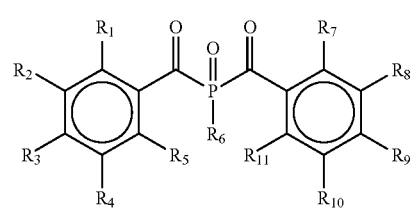

III wherein $R_1$, $R_2$, $R_3$, $R_4$, $R_5$, $R_7$, $R_8$, $R_9$, $R_{10}$ and $R_{11}$ are the same or different and are independently selected from H, halogen, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl, $C_6$-$C_{12}$-aryl, $C_3$-$C_8$-cycloalkoxy, $C_7$-$C_{12}$-arylalkoxy, $C_9$-$C_{15}$-alkenylarylalkoxy, nitro-, $C_6$-$C_{12}$-arylsulfonyl, 4-alkylarylsulfonyl, $C_1$-$C_{20}$-alkylcarboxy, $C_1$-$C_8$-alkoxycarbonyl, $SR_{12}$, $NHR_{12}$ or $NR_{12}R_{13}$ with $R_{12}$ and $R_{13}$ being independently selected from H, linear or branched $C_1$-$C_{20}$-alkyl, linear or branched $C_2$-$C_8$-alkenyl and $C_3$-$C_8$-cycloalkyl, and an O-, S- or N-containing 5- or 6-membered heterocyclic ring; $R_6$ is OH.

According to one embodiment, step c) is carried out at a temperature in the range from −78 to +50° C., preferably in the range from 0 to 40° C., more preferably in the range from 0 to 30° C., and most preferably in the range from 2 to 28° C.

According to a further aspect of the present invention, a bis(acyl)phosphinic acid silyl ester of the general formula I,

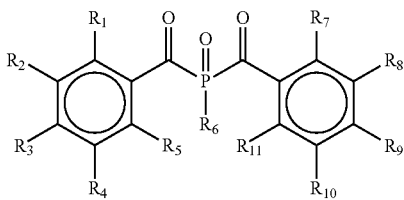

wherein $R_1$, $R_2$, $R_3$, $R_4$, $R_5$, $R_7$, $R_8$, $R_9$, $R_{10}$ and $R_{11}$ are the same or different and are independently selected from H, halogen, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl, $C_6$-$C_{12}$-aryl, $C_3$-$C_8$-cycloalkoxy, $C_7$-$C_{12}$-arylalkoxy, $C_9$-$C_{15}$-alkenylarylalkoxy, nitro-, $C_6$-$C_{12}$-arylsulfonyl, 4-alkylarylsulfonyl, $C_1$-$C_{20}$-alkylcarboxy, $C_1$-$C_8$-alkoxycarbonyl, $SR_{12}$, $NHR_{12}$ or $NR_{12}R_{13}$ with $R_{12}$ and $R_{13}$ being independently selected from H, linear or branched $C_1$-$C_{20}$-alkyl, linear or branched $C_2$-$C_8$-alkenyl and $C_3$-$C_8$-cycloalkyl, and an O-, S- or N-containing 5- or 6-membered heterocyclic ring; $R_6$ is $OSiR_{14}R_{15}R_{16}$ with $R_{14}$, $R_{15}$ and $R_{16}$ being independently selected from linear or branched $C_1$-$C_{20}$-alkyl or $C_6$-$C_{12}$-aryl, obtained by a process, as defined herein, is provided.

According to another aspect of the present invention, a bis(acyl)phosphinic acid of the general formula III,

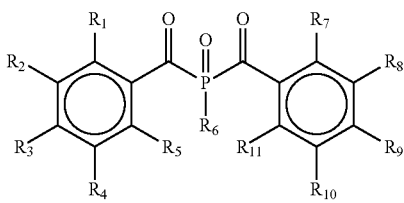

wherein $R_1$, $R_2$, $R_3$, $R_4$, $R_5$, $R_7$, $R_8$, $R_9$, $R_{10}$ and $R_{11}$ are the same or different and are independently selected from H, halogen, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl, $C_6$-$C_{12}$-aryl, $C_3$-$C_8$-cycloalkoxy, $C_7$-$C_{12}$-arylalkoxy, $C_9$-$C_{15}$-alkenylarylalkoxy, nitro-, $C_6$-$C_{12}$-arylsulfonyl, 4-alkylarylsulfonyl, $C_1$-$C_{20}$-alkylcarboxy, $C_1$-$C_8$-alkoxycarbonyl, $SR_{12}$, $NHR_{12}$ or $NR_{12}R_{13}$ with $R_{12}$ and $R_{13}$ being independently selected from H, linear or branched $C_1$-$C_{20}$-alkyl, linear or branched $C_2$-$C_8$-alkenyl and $C_3$-$C_8$-cycloalkyl, and an O-, S- or N-containing 5- or 6-membered heterocyclic ring; $R_6$ is OH, obtained by a process, as defined herein, is provided.

In the following, the details and preferred embodiments of the inventive process for the preparation of the bis(acyl)phosphinic acid silyl ester of the general formula I as well as the bis(acyl)phosphinic acid of the general formula II will be described in more detail. It is to be understood that these technical details and embodiments also apply to the inventive products, as far as applicable.

DETAILED DESCRIPTION OF THE INVENTION

A process for the preparation of a bis(acyl)phosphinic acid silyl ester of the general formula I is provided. It is appreciated that a bis(acyl)phosphinic acid silyl ester of the general formula I is prepared,

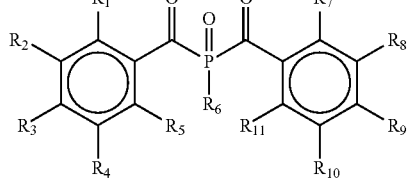

wherein $R_1$, $R_2$, $R_3$, $R_4$, $R_5$, $R_7$, $R_8$, $R_9$, $R_{10}$ and $R_{11}$ are the same or different and are independently selected from H, halogen, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl, $C_6$-$C_{12}$-aryl, $C_3$-$C_8$-cycloalkoxy, $C_7$-$C_{12}$-arylalkoxy, $C_9$-$C_{15}$-alkenylarylalkoxy, nitro-, $C_6$-$C_{12}$-arylsulfonyl, 4-alkylarylsulfonyl, $C_1$-$C_{20}$-alkylcarboxy, $C_1$-$C_8$-alkoxycarbonyl, $SR_{12}$, $NHR_{12}$ or $NR_{12}R_{13}$ with $R_{12}$ and $R_{13}$ being independently selected from H, linear or branched $C_1$-$C_{20}$-alkyl, linear or branched $C_2$-$C_8$-alkenyl and $C_3$-$C_8$-cycloalkyl, and an O-, S- or N-containing 5- or 6-membered heterocyclic ring; $R_6$ is $OSiR_{14}R_{15}R_{16}$ with $R_{14}$, $R_{15}$ and $R_{16}$ being independently selected from linear or branched $C_1$-$C_{20}$-alkyl or $C_6$-$C_{12}$-aryl.

As regards $R_1$, $R_2$, $R_3$, $R_4$ and $R_5$ in the general formula I, it is to be noted that they can be the same or different. Preferably, $R_1$, $R_2$, $R_3$, $R_4$ and $R_5$ are the same or different and are independently selected from H, halogen, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl, $C_6$-$C_{12}$-aryl, $C_3$-$C_8$-cycloalkoxy, $C_7$-$C_{12}$-arylalkoxy, $C_9$-$C_{15}$-alkenylarylalkoxy, nitro-, $C_6$-$C_{12}$-arylsulfonyl, 4-alkylarylsulfonyl, $C_1$-$C_{20}$-alkylcarboxy, $C_1$-$C_8$-alkoxycarbonyl, $SR_{12}$, $NHR_{12}$ or $NR_{12}R_{13}$ with $R_{12}$ and $R_{13}$ being independently selected from H, linear or branched $C_1$-$C_{20}$-alkyl, linear or branched $C_2$-$C_8$-alkenyl and $C_3$-$C_8$-cycloalkyl, and an O-, S- or N-containing 5- or 6-membered heterocyclic ring.

The term "linear or branched $C_1$-$C_{20}$-alkyl" in the meaning of the present invention refers to a linear or branched chain alkyl group having 1 to 20 carbon atoms, and includes, for example, methyl, ethyl, propyl, isopropyl, n-butyl, isobutyl, sec. butyl, tert. butyl, n-pentyl, isopentyl, neopentyl, hexyl, heptyl, octyl, 2-ethylhexyl, 1,1,3,3-tetramethylbutyl, n-heptyl, 2,4,4 trimethylpentyl, 2-ethylhexyl, octyl, nonyl, decyl, undecyl, dodecyl, tetradecyl, pentadecyl, hexadecyl, heptadecyl, octadecyl, nonadecyl and eicosyl.

The term "linear or branched $C_2$-$C_8$-alkenyl" in the meaning of the present invention refers to a linear or branched chain alkenyl group having 2 to 8 carbon atoms, and includes, for example, ethenyl, propenyl, butenyl, triisobutenyl, pentenyl, hexenyl, heptenyl and octenyl, preferably ethenyl or propenyl. The term "alkenyl" in the meaning of the present invention includes the cis and trans isomers.

The term "$C_1$-$C_8$-alkoxy" in the meaning of the present invention means that the alkoxy moiety has a linear or branched chain alkyl having 1 to 8 carbon atoms, and includes, for example, methoxy, ethoxy, propoxy, isopropoxy, butoxy, isobutoxy, tertiary butoxy, pentyloxy, hexyloxy, heptyloxy and octyloxy.

The term "$C_2$-$C_8$-alkenyloxy" in the meaning of the present invention means that the alkenyloxy moiety has a linear or branched chain alkenyl having 2 to 8 carbon atoms, and includes, for example, ethenyloxy, propenyloxy, butenyloxy, triisobutenyloxy, pentenyloxy, hexenyloxy, heptenyloxy and octenyloxy.

The term "$C_3$-$C_8$-cycloalkyl" in the meaning of the present invention refers to a cyclic alkyl having 3 to 8 carbon atoms, and includes, for example, cyclopropyl, cyclobutyl, cyclopentyl, cyclohexyl, and cycloheptyl, preferably cyclopentyl and cyclohexyl.

The term "$C_6$-$C_{12}$-aryl" in the meaning of the present invention refers to a group containing one or more 6-membered unsaturated hydrocarbon ring(s), wherein the unsaturation is represented formally by conjugated double bonds and which may optionally be substituted at one or more carbon atoms of such ring(s) by independently selected alkyl groups, and includes, for example, phenyl, naphthyl, methylphenyl, dimethoxyphenyl, 5-isopropyl-2-methylphenyl, methylphenyl and t-butylphenyl, preferably naphthyl.

The term "$C_3$-$C_8$-cycloalkoxy" in the meaning of the present invention means that the cycloalkoxy moiety has a cyclic alkyl having 3 to 8 carbon atoms, and includes, for example, cyclopropyloxy, cyclobutyloxy, cyclopentyloxy, cyclohexyloxy, and cycloheptyloxy, preferably cyclopentyloxy and cyclohexyloxy.

The term "$C_7$-$C_{12}$-arylalkoxy" in the meaning of the present invention means that the alkoxy moiety has a linear or branched chain alkyl having 1 to 8 carbon atoms, preferably 1 or 2 carbon atoms, which is connected to $C_6$-$C_{12}$-aryl.

The term "$C_9$-$C_{15}$-alkenylarylalkoxy" in the meaning of the present invention means that the alkoxy moiety has a linear or branched chain alkyl having 1 to 8 carbon atoms, preferably 1 or 2 carbon atoms, which is connected to $C_6$-$C_{12}$-aryl, preferably $C_6$-aryl, which is further connected to linear or branched $C_2$-$C_8$-alkenyl, preferably $C_2$-alkenyl. Preferably, the alkoxy and alkenyl moieties are connected in para-position of the aryl moiety.

The term "$C_6$-$C_{12}$-arylsulfonyl" in the meaning of the present invention refers to a sulfonyl moiety having a $C_6$-$C_{12}$-aryl.

The term "4-alkylarylsulfonyl" in the meaning of the present invention refers to a sulfonyl moiety having a $C_6$-$C_{12}$-aryl, which is connected to a linear or branched $C_1$-$C_{20}$-alkyl. The alkyl moiety is connected in para-position of the aryl moiety.

The term "halogen" in the meaning of the present invention refers to chloro, bromo or iodo.

Preferably, $R_1$, $R_2$, $R_3$, $R_4$ and $R_5$ are the same or different and are independently selected from H, halogen, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl, $C_6$-$C_{12}$-aryl, $C_3$-$C_8$-cycloalkoxy, $C_7$-$C_{12}$-arylalkoxy, $C_9$-$C_{15}$-alkenylarylalkoxy, nitro-, $C_6$-$C_{12}$-arylsulfonyl, 4-alkylarylsulfonyl, $C_1$-$C_{20}$-alkylcarboxy, $C_1$-$C_8$-alkoxycarbonyl and an O-, S- or N-containing 5- or 6-membered heterocyclic ring.

In one embodiment, $R_1$, $R_2$, $R_3$, $R_4$ and $R_5$ in the general formula I are the same or different and are independently selected from H, halogen, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl and $C_6$-$C_{12}$-aryl. Preferably, $R_1$, $R_2$, $R_3$, $R_4$ and $R_5$ are the same or different and are independently selected from H, halogen and, linear or branched $C_1$-$C_{20}$-alkyl. Most preferably, $R_1$, $R_2$, $R_3$, $R_4$ and $R_5$ are the same or different and are independently selected from H and, linear or branched $C_1$-$C_{20}$-alkyl.

Thus, it is preferred that one or more of $R_1$, $R_2$, $R_3$, $R_4$ and $R_5$ is/are H.

Additionally or alternatively, it is preferred that one or more of $R_1$, $R_2$, $R_3$, $R_4$ and $R_5$ is/are linear or branched $C_1$-$C_{20}$-alkyl, preferably linear or branched $C_1$-$C_{18}$-alkyl, more preferably linear or branched $C_1$-$C_{12}$-alkyl and most preferably linear $C_1$-$C_8$-alkyl, e.g. linear $C_1$-$C_8$-alkyl. For example, one or more of $R_1$, $R_2$, $R_3$, $R_4$ and $R_5$ is/are linear or branched $C_1$-$C_6$-alkyl, e.g. linear $C_1$-$C_6$-alkyl, preferably linear or branched $C_1$-$C_4$-alkyl, e.g. linear $C_1$-$C_4$-alkyl, and most preferably linear or branched $C_1$-$C_3$-alkyl, e.g. linear $C_1$-$C_3$-alkyl. It is especially preferred that one or more of $R_1$, $R_2$, $R_3$, $R_4$ and $R_5$ is/are $C_1$- or $C_2$-alkyl, e.g. $C_1$-alkyl.

Preferably, $R_1$, $R_3$ and $R_5$ are the same. In this embodiment, $R_1$, $R_3$ and $R_5$ are preferably selected from H, halogen, linear or branched $C_1$-$C_8$-alkyl, linear or branched $C_2$-$C_8$-alkenyl, $C_1$-$C_8$-alkoxy, $C_2$-$C_8$-alkenyloxy, $C_3$-$C_8$-cycloalkyl, $C_6$-$C_{12}$-aryl, $C_3$-$C_8$-cycloalkoxy, $C_7$-$C_{12}$-arylalkoxy, $C_9$-$C_{15}$-alkenylarylalkoxy, nitro-, $C_6$-$C_{12}$-arylsulfonyl, 4-alkylarylsulfonyl, $C_1$-$C_{20}$-alkylcarboxy, $C_1$-$C_8$-alkoxycarbonyl, $SR_{12}$, $NHR_{12}$ or $NR_{12}R_{13}$ with $R_{12}$ and $R_{13}$ being independently selected from H, linear or branched $C_1$-$C_{20}$-alkyl, linear or branched $C_2$-$C_8$-alkenyl and $C_3$-$C_8$-cycloalkyl, and an O-, S- or N-containing 5- or 6-membered heterocyclic ring. For example, $R_1$, $R_3$ and $R_5$ are the same and are selected from linear or branched $C_1$-$C_8$-alkyl, linear or branched $C_2$-$C_8$-alkenyl, $C_1$-$C_8$-alkoxy, $C_2$-$C_8$-alkenyloxy, $C_3$-$C_8$-cycloalkyl and an O-, S- or N-containing 5- or 6-membered heterocyclic ring.

In one embodiment, $R_1$, $R_3$ and $R_5$ are the same and are linear or branched $C_1$-$C_{20}$-alkyl, preferably linear or branched $C_1$-$C_{18}$-alkyl, more preferably linear or branched $C_1$-$C_{12}$-alkyl and most preferably linear $C_1$-$C_8$-alkyl, e.g. linear $C_1$-$C_8$-alkyl. For example, $R_1$, $R_3$ and $R_5$ are the same and are linear or branched $C_1$-$C_6$-alkyl, e.g. linear $C_1$-$C_6$-alkyl, preferably linear or branched $C_1$-$C_4$-alkyl, e.g. linear $C_1$-$C_4$-alkyl, and most preferably linear or branched $C_1$-$C_3$-alkyl, e.g. linear $C_1$-$C_3$-alkyl. It is especially preferred that $R_1$, $R_3$ and $R_5$ are the same and are $C_1$- or $C_2$-alkyl, e.g. $C_1$-alkyl.

In one embodiment, $R_1$, $R_3$ and $R_5$ are the same and are $SR_{12}$, $NHR_{12}$ or $NR_{12}R_{13}$ with $R_{12}$ and $R_{13}$ being independently selected from H, linear or branched $C_1$-$C_{20}$-alkyl, linear or branched $C_2$-$C_8$-alkenyl and $C_3$-$C_8$-cycloalkyl.

In one embodiment, $R_2$ and $R_4$ are the same. In this embodiment, $R_2$ and $R_4$ are preferably selected from H, halogen, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl, $C_6$-$C_{12}$-aryl, $C_3$-$C_8$-cycloalkoxy, $C_7$-$C_{12}$-arylalkoxy, $C_9$-$C_{15}$-alkenylarylalkoxy, nitro-, $C_6$-$C_{12}$-arylsulfonyl, 4-alkylarylsulfonyl, $C_1$-$C_{20}$-alkylcarboxy, $C_1$-$C_8$-alkoxycarbonyl, $SR_{12}$, $NHR_{12}$ or $NR_{12}R_{13}$ with $R_{12}$ and $R_{13}$ being independently selected from H, linear or branched $C_1$-$C_{20}$-alkyl, linear or branched $C_2$-$C_8$-alkenyl and $C_3$-$C_8$-cycloalkyl, and an O-, S- or N-containing 5- or 6-membered heterocyclic ring. Preferably, $R_2$ and $R_4$ are selected from H, halogen, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl, $C_6$-$C_{12}$-aryl, $C_3$-$C_8$-cycloalkoxy, $C_7$-$C_{12}$-arylalkoxy, $C_9$-$C_{15}$-alkenylarylalkoxy and an O-, S- or N-containing 5- or 6-membered heterocyclic ring. For example, $R_2$ and $R_4$ are the same and are selected from H, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl and an O-, S- or N-containing 5- or 6-membered heterocyclic ring.

In one embodiment, $R_2$ and $R_4$ are the same and are H.

It is appreciated that $R_2$ and $R_4$ are preferably different from $R_1$, $R_3$ and $R_5$. Thus, if $R_2$ and $R_4$ are different from $R_1$, $R_3$, and $R_5$, $R_2$ and $R_4$ are preferably the same and are H and $R_1$, $R_3$ and $R_5$ are the same and are linear or branched $C_1$-$C_{20}$-alkyl, preferably linear or branched $C_1$-$C_{18}$-alkyl, more preferably linear or branched $C_1$-$C_{12}$-alkyl and most preferably linear $C_1$-$C_8$-alkyl, e.g. linear $C_1$-$C_8$-alkyl. For example, $R_2$ and $R_4$ are the same and are H and $R_1$, $R_3$ and $R_5$ are the same and are linear or branched $C_1$-$C_6$-alkyl, e.g. linear $C_1$-$C_6$-alkyl, preferably linear or branched $C_1$-$C_4$-alkyl, e.g. linear $C_1$-$C_4$-alkyl, and most preferably linear or branched $C_1$-$C_3$-alkyl, e.g. linear $C_1$-$C_3$-alkyl. It is especially preferred that $R_2$ and $R_4$ are the same and are H and $R_1$, $R_3$ and $R_5$ are the same and are $C_1$- or $C_2$-alkyl, e.g. $C_1$-alkyl.

In one embodiment, $R_2$ and $R_4$ are the same and are H and $R_1$, $R_3$ and $R_5$ are the same and are $SR_{12}$, $NHR_{12}$ or $NR_{12}R_{13}$ with $R_{12}$ and $R_{13}$ being independently selected from H, linear or branched $C_1$-$C_{20}$-alkyl, linear or branched $C_2$-$C_8$-alkenyl and $C_3$-$C_8$-cycloalkyl.

As regards $R_7$, $R_8$, $R_9$, $R_{10}$ and $R_{11}$ in the general formula I, it is to be noted that they can be the same or different. Preferably, $R_7$, $R_8$, $R_9$, $R_{10}$ and $R_{11}$ are the same or different and are independently selected from H, halogen, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl, $C_6$-$C_{12}$-aryl, $C_3$-$C_8$-cycloalkoxy, $C_7$-$C_{12}$-arylalkoxy, $C_9$-$C_{15}$-alkenylarylalkoxy, nitro-, $C_6$-$C_{12}$-arylsulfonyl, 4-alkylarylsulfonyl, $C_1$-$C_{20}$-alkylcarboxy, $C_1$-$C_8$-alkoxycarbonyl, $SR_{12}$, $NHR_{12}$ or $NR_{12}R_{13}$ with $R_{12}$ and $R_{13}$ being independently selected from H, linear or branched $C_1$-$C_{20}$-alkyl, linear or branched $C_2$-$C_8$-alkenyl and $C_3$-$C_8$-cycloalkyl, and an O-, S- or N-containing 5- or 6-membered heterocyclic ring. More preferably, $R_7$, $R_8$, $R_9$, $R_{10}$ and $R_{11}$ are the same or different and are independently selected from H, halogen, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl, $C_6$-$C_{12}$-aryl, $C_3$-$C_8$-cycloalkoxy, $C_7$-$C_{12}$-arylalkoxy, $C_9$-$C_{15}$-alkenylarylalkoxy and an O-, S- or N-containing 5- or 6-membered heterocyclic ring.

In one embodiment, $R_7$, $R_8$, $R_9$, $R_{10}$ and $R_{11}$ in the general formula I are the same or different and are independently selected from H, halogen, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl and $C_6$-$C_{12}$-aryl. Preferably, $R_7$, $R_8$, $R_9$, $R_{10}$ and $R_{11}$ are the same or different and are independently selected from H, halogen and, linear or branched $C_1$-$C_{20}$-alkyl. Most preferably, $R_7$, $R_8$, $R_9$, $R_{10}$ and $R_{11}$ are the same or different and are independently selected from H and, linear or branched $C_1$-$C_{20}$-alkyl.

Thus, it is preferred that one or more of $R_7$, $R_8$, $R_9$, $R_{10}$ and $R_{11}$ is/are H.

Additionally or alternatively, it is preferred that one or more of $R_7$, $R_8$, $R_9$, $R_{10}$ and $R_{11}$ is/are linear or branched $C_1$-$C_{20}$-alkyl, preferably linear or branched $C_1$-$C_{18}$-alkyl, more preferably linear or branched $C_1$-$C_{12}$-alkyl and most preferably linear $C_1$-$C_8$-alkyl, e.g. linear $C_1$-$C_8$-alkyl. For example, one or more of $R_7$, $R_8$, $R_9$, $R_{10}$ and $R_{11}$ is/are linear or branched $C_1$-$C_6$-alkyl, e.g. linear $C_1$-$C_6$-alkyl, preferably linear or branched $C_1$-$C_4$-alkyl, e.g. linear $C_1$-$C_4$-alkyl, and most preferably linear or branched $C_1$-$C_3$-alkyl, e.g. linear $C_1$-$C_3$-alkyl. It is especially preferred that one or more of $R_7$, $R_8$, $R_9$, $R_{10}$ and $R_{11}$ is/are $C_1$- or $C_2$-alkyl, e.g. $C_1$-alkyl.

Preferably, $R_7$, $R_9$ and $R_{11}$ are the same. In this embodiment, $R_7$, $R_9$ and $R_{11}$ are preferably selected from H, halogen, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl, $C_6$-$C_{12}$-aryl, $C_3$-$C_8$-cycloalkoxy, $C_7$-$C_{12}$-arylalkoxy, $C_9$-$C_{15}$-alkenylarylalkoxy, nitro-, $C_6$-$C_{12}$-arylsulfonyl, 4-alkylarylsulfonyl, $C_1$-$C_{20}$-alkylcarboxy, $C_1$-$C_8$-alkoxycarbonyl, $SR_{12}$, $NHR_{12}$ or $NR_{12}R_{13}$ with $R_{12}$ and $R_{13}$ being independently selected from H, linear or branched $C_1$-$C_{20}$-alkyl, linear or branched $C_2$-$C_8$-alkenyl and $C_3$-$C_8$-cycloalkyl, and an O-, S- or N-containing 5- or 6-membered heterocyclic ring. Preferably, $R_7$, $R_9$ and $R_{11}$ are selected from H, halogen, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl, $C_6$-$C_{12}$-aryl, $C_3$-$C_8$-cycloalkoxy, $C_7$-$C_{12}$-arylalkoxy, $C_9$-$C_{15}$-alkenylarylalkoxy and an O-, S- or N-containing 5- or 6-membered heterocyclic ring. For example, $R_7$, $R_9$ and $R_{11}$ are the same and are selected from linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl and an O-, S- or N-containing 5- or 6-membered heterocyclic ring.

In one embodiment, $R_7$, $R_9$ and $R_{11}$ are the same and are linear or branched $C_1$-$C_{20}$-alkyl, preferably linear or branched $C_1$-$C_{18}$-alkyl, more preferably linear or branched $C_1$-$C_{12}$-alkyl and most preferably linear $C_1$-$C_8$-alkyl, e.g. linear $C_1$-$C_8$-alkyl. For example, $R_7$, $R_9$ and $R_{11}$ are the same and are linear or branched $C_1$-$C_6$-alkyl, e.g. linear $C_1$-$C_6$-alkyl, preferably linear or branched $C_1$-$C_4$-alkyl, e.g. linear $C_1$-$C_4$-alkyl, and most preferably linear or branched $C_1$-$C_3$-alkyl, e.g. linear $C_1$-$C_3$-alkyl. It is especially preferred that $R_7$, $R_9$ and $R_{11}$ are the same and are $C_1$- or $C_2$-alkyl, e.g. $C_1$-alkyl.

In one embodiment, $R_7$, $R_9$ and $R_{11}$ are the same and are $SR_{12}$, $NHR_{12}$ or $NR_{12}R_{13}$ with $R_{12}$ and $R_{13}$ being independently selected from H, linear or branched $C_1$-$C_{20}$-alkyl, linear or branched $C_2$-$C_8$-alkenyl and $C_3$-$C_8$-cycloalkyl.

In one embodiment, $R_8$ and $R_{10}$ are the same. In this embodiment, $R_8$ and $R_{10}$ are preferably selected from H, halogen, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl, $C_6$-$C_{12}$-aryl, $C_3$-$C_8$-cycloalkoxy, $C_7$-$C_{12}$-arylalkoxy, $C_9$-$C_{15}$-alkenylarylalkoxy, nitro-, $C_6$-$C_{12}$-arylsulfonyl, 4-alkylarylsulfonyl, $C_1$-$C_{20}$-alkylcarboxy, $C_1$-$C_8$-alkoxycarbonyl, $SR_{12}$, $NHR_{12}$ or $NR_{12}R_{13}$ with $R_{12}$ and $R_{13}$ being independently selected from H, linear or branched $C_1$-$C_{20}$-alkyl, linear or branched $C_2$-$C_8$-alkenyl and $C_3$-$C_8$-cycloalkyl, and an O-, S- or N-containing 5- or 6-membered heterocyclic ring. Preferably, $R_8$ and $R_{10}$ are selected from H, halogen, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl, $C_6$-$C_{12}$-aryl, $C_3$-$C_8$-cycloalkoxy, $C_7$-$C_{12}$-arylalkoxy, $C_9$-$C_{15}$-alkenylarylalkoxy and an O-, S- or N-containing 5- or 6-membered heterocyclic ring. For example, $R_8$ and $R_{10}$ are the same and are selected from H, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl and an O-, S- or N-containing 5- or 6-membered heterocyclic ring.

In one embodiment, $R_8$ and $R_{10}$ are the same and are H.

It is appreciated that $R_8$ and $R_{10}$ are preferably different from $R_7$, $R_9$ and $R_{11}$. Thus, if $R_8$ and $R_{10}$ are different from $R_7$, $R_9$ and $R_{11}$, $R_8$ and $R_{10}$ are preferably the same and are H and $R_7$, $R_9$ and $R_{11}$ are the same and are linear or branched $C_1$-$C_{20}$-alkyl, preferably linear or branched $C_1$-$C_{18}$-alkyl, more preferably linear or branched $C_1$-$C_{12}$-alkyl and most preferably linear $C_1$-$C_8$-alkyl, e.g. linear $C_1$-$C_8$-alkyl. For example, $R_8$ and $R_{10}$ are the same and are H and $R_7$, $R_9$ and $R_{11}$ are the same and are linear or branched $C_1$-$C_6$-alkyl, e.g. linear $C_1$-$C_6$-alkyl, preferably linear or branched $C_1$-$C_4$-alkyl, e.g. linear $C_1$-$C_4$-alkyl, and most preferably linear or branched $C_1$-$C_3$-alkyl, e.g. linear $C_1$-$C_3$-alkyl. It is especially preferred that $R_8$ and $R_{10}$ are the same and are H and $R_7$, $R_9$ and $R_{11}$ are the same and are $C_1$- or $C_2$-alkyl, e.g. $C_1$-alkyl.

In one embodiment, $R_8$ and $R_{10}$ are the same and are H and $R_7$, $R_9$ and $R_{11}$ are the same and are $SR_{12}$, $NHR_{12}$ or $NR_{12}R_{13}$ with $R_{12}$ and $R_{13}$ being independently selected from H, linear or branched $C_1$-$C_{20}$-alkyl, linear or branched $C_2$-$C_8$-alkenyl and $C_3$-$C_8$-cycloalkyl.

As regards $R_1$, $R_2$, $R_3$, $R_4$, $R_5$, $R_7$, $R_8$, $R_9$, $R_{10}$ and $R_{11}$ in general formula I, it is to be noted that they can be the same or different. Preferably, $R_1$, $R_2$, $R_3$, $R_4$, $R_5$, $R_7$, $R_8$, $R_9$, $R_{10}$ and $R_{11}$ are the same or different and are independently selected from H, halogen, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl, $C_6$-$C_{12}$-aryl, $C_3$-$C_8$-cycloalkoxy, $C_7$-$C_{12}$-arylalkoxy, $C_9$-$C_{15}$-alkenylarylalkoxy, nitro-, $C_6$-$C_{12}$-arylsulfonyl, 4-alkylarylsulfonyl, $C_1$-$C_{20}$-alkylcarboxy, $C_1$-$C_8$-alkoxycarbonyl, $SR_{12}$, $NHR_{12}$ or $NR_{12}R_{13}$ with $R_{12}$ and $R_{13}$ being independently selected from H, linear or branched $C_1$-$C_{20}$-alkyl, linear or branched $C_2$-$C_8$-alkenyl and $C_3$-$C_8$-cycloalkyl, and an O-, S- or N-containing 5- or 6-membered heterocyclic ring.

In one embodiment, $R_1$, $R_2$, $R_3$, $R_4$, $R_5$, $R_7$, $R_8$, $R_9$, $R_{10}$ and $R_{11}$ in the general formula I are the same or different and are independently selected from H, halogen, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl and $C_6$-$C_{12}$-aryl. Preferably, $R_1$, $R_2$, $R_3$, $R_4$, $R_5$, $R_7$, $R_8$, $R_9$, $R_{10}$ and $R_{11}$ are the same or different and are independently selected from H, halogen and, linear or branched $C_1$-$C_{20}$-alkyl. Most preferably, $R_1$, $R_2$, $R_3$, $R_4$, $R_5$, $R_7$, $R_8$, $R_9$, $R_{10}$ and $R_{11}$ are the same or different and are independently selected from H and, linear or branched $C_1$-$C_{20}$-alkyl.

In one embodiment, $R_1$, $R_2$, $R_3$, $R_4$, $R_5$, $R_7$, $R_8$, $R_9$, $R_{10}$ and $R_{11}$ in general formula I are the same. In this embodiment, $R_1$, $R_2$, $R_3$, $R_4$, $R_5$, $R_7$, $R_8$, $R_9$, $R_{10}$ and $R_{11}$ are preferably H.

Alternatively, $R_1$, $R_2$, $R_3$, $R_4$, $R_5$, $R_7$, $R_8$, $R_9$, $R_{10}$ and $R_{11}$ in general formula I are different.

It is preferred that one or more of $R_1$, $R_2$, $R_3$, $R_4$, $R_5$, $R_7$, $R_8$, $R_9$, $R_{10}$ and $R_{11}$ in general formula I is/are H.

Additionally or alternatively, it is preferred that one or more of $R_1$, $R_2$, $R_3$, $R_4$, $R_5$, $R_7$, $R_8$, $R_9$, $R_{10}$ and $R_{11}$ in general formula I is/are linear or branched $C_1$-$C_{20}$-alkyl, preferably linear or branched $C_1$-$C_{18}$-alkyl, more preferably linear or branched $C_1$-$C_{12}$-alkyl and most preferably linear $C_1$-$C_8$-alkyl, e.g. linear $C_1$-$C_8$-alkyl. For example, one or more of $R_1$, $R_2$, $R_3$, $R_4$, $R_5$, $R_7$, $R_8$, $R_9$, $R_{10}$ and $R_{11}$ is/are linear or branched $C_1$-$C_6$-alkyl, e.g. linear $C_1$-$C_6$-alkyl, preferably linear or branched $C_1$-$C_4$-alkyl, e.g. linear $C_1$-$C_4$-alkyl, and most preferably linear or branched $C_1$-$C_3$-alkyl, e.g. linear $C_1$-$C_3$-alkyl. It is especially preferred that one or more of $R_1$, $R_2$, $R_3$, $R_4$, $R_5$, $R_7$, $R_8$, $R_9$, $R_{10}$ and $R_{11}$ in general formula I is/are $C_1$- or $C_2$-alkyl, e.g. $C_1$-alkyl.

Preferably, $R_1$, $R_3$, $R_5$, $R_7$, $R_9$ and $R_{11}$ in general formula I are the same. In this embodiment, $R_1$, $R_3$, $R_5$, $R_7$, $R_9$ and $R_{11}$ are selected from H, halogen, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl, $C_6$-$C_{12}$-aryl, $C_3$-$C_8$-cycloalkoxy, $C_7$-$C_{12}$-arylalkoxy, $C_9$-$C_{15}$-alkenylarylalkoxy, nitro-, $C_6$-$C_{12}$-arylsulfonyl, 4-alkylarylsulfonyl, $C_1$-$C_{20}$-alkylcarboxy, $C_1$-$C_8$-alkoxycarbonyl, $SR_{12}$, $NHR_{12}$ or $NR_{12}R_{13}$ with $R_{12}$ and $R_{13}$ being independently selected from H, linear or branched $C_1$-$C_{20}$-alkyl, linear or branched $C_2$-$C_8$-alkenyl and $C_3$-$C_8$-cycloalkyl, and an O-, S- or N-containing 5- or 6-membered heterocyclic ring. Preferably, $R_1$, $R_3$, $R_5$, $R_7$, $R_9$ and $R_{11}$ are the same and are selected from H, halogen, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl, $C_6$-$C_{12}$-aryl, $C_3$-$C_8$-cycloalkoxy, $C_7$-$C_{12}$-arylalkoxy, $C_9$-$C_{15}$-alkenylarylalkoxy, and an O-, S- or N-containing 5- or 6-membered heterocyclic ring. For example, $R_1$, $R_3$, $R_5$, $R_7$, $R_9$ and $R_{11}$ are the same and are selected from linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl and an O-, S- or N-containing 5- or 6-membered heterocyclic ring.

In one embodiment, $R_1$, $R_3$, $R_5$, $R_7$, $R_9$ and $R_{11}$ in general formula I are the same and are linear or branched $C_1$-$C_{20}$-alkyl, preferably linear or branched $C_1$-$C_{18}$-alkyl, more preferably linear or branched $C_1$-$C_{12}$-alkyl and most preferably linear $C_1$-$C_8$-alkyl, e.g. linear $C_1$-$C_8$-alkyl. For example, $R_1$, $R_3$, $R_5$, $R_7$, $R_9$ and $R_{11}$ are the same and are linear or branched $C_1$-$C_6$-alkyl, e.g. linear $C_1$-$C_6$-alkyl, preferably linear or branched $C_1$-$C_4$-alkyl, e.g. linear $C_1$-$C_4$-alkyl, and most preferably linear or branched $C_1$-$C_3$-alkyl, e.g. linear $C_1$-$C_3$-alkyl. It is especially preferred that $R_1$, $R_3$, $R_5$, $R_7$, $R_9$ and $R_{11}$ are the same and are $C_1$- or $C_2$-alkyl, e.g. $C_1$-alkyl.

In one embodiment, $R_2$, $R_4$, $R_8$ and $R_{10}$ in general formula I are the same. In this embodiment, $R_2$, $R_4$, $R_8$ and $R_{10}$ are selected from H, halogen, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl, $C_6$-$C_{12}$-aryl, $C_3$-$C_8$-cycloalkoxy, $C_7$-$C_{12}$-arylalkoxy, $C_9$-$C_{15}$-alkenylarylalkoxy, nitro-, $C_6$-$C_{12}$-arylsulfonyl, 4-alkylarylsulfonyl, $C_1$-$C_{20}$-alkylcarboxy, $C_1$-$C_8$-alkoxycarbonyl, $SR_{12}$, $NHR_{12}$ or $NR_{12}R_{13}$ with $R_{12}$ and $R_{13}$ being independently selected from H, linear or branched $C_1$-$C_{20}$-alkyl, linear or branched $C_2$-$C_8$-alkenyl and $C_3$-$C_8$-cycloalkyl, and an O-, S- or N-containing 5- or 6-membered heterocyclic ring. Preferably, $R_2$, $R_4$, $R_8$ and $R_{10}$ are selected from H, halogen, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl, $C_6$-$C_{12}$-aryl, $C_3$-$C_8$-cycloalkoxy, $C_7$-$C_{12}$-arylalkoxy, $C_9$-$C_{15}$-alkenylarylalkoxy and an O-, S- or N-containing 5- or 6-membered heterocyclic ring. For example, $R_2$, $R_4$, $R_8$ and $R_{10}$ are the same and are selected from H, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl and an O-, S- or N-containing 5- or 6-membered heterocyclic ring.

In one embodiment, $R_2$, $R_4$, $R_8$ and $R_{10}$ are the same and are H.

It is appreciated that $R_2$, $R_4$, $R_8$ and $R_{10}$ are preferably different from $R_1$, $R_3$, $R_5$, $R_7$, $R_9$ and $R_{11}$. Thus, if $R_2$, $R_4$, $R_8$ and $R_{10}$ are different from $R_1$, $R_3$, $R_5$, $R_7$, $R_9$ and $R_{11}$, $R_2$, $R_4$, $R_8$ and $R_{10}$ are preferably the same and are H and $R_1$, $R_3$, $R_5$, $R_7$, $R_9$ and $R_{11}$ are the same and are linear or branched $C_1$-$C_{20}$-alkyl, preferably linear or branched $C_1$-$C_{18}$-alkyl, more preferably linear or branched $C_1$-$C_{12}$-alkyl and most preferably linear $C_1$-$C_8$-alkyl, e.g. linear $C_1$-$C_8$-alkyl. For example, $R_2$, $R_4$, $R_8$ and $R_{10}$ are the same and are H and $R_1$, $R_3$, $R_5$, $R_7$, $R_9$ and $R_{11}$ are the same and are linear or branched $C_1$-$C_6$-alkyl, e.g. linear $C_1$-$C_6$-alkyl, preferably linear or branched $C_1$-$C_4$-alkyl, e.g. linear $C_1$-$C_4$-alkyl, and most preferably linear or branched $C_1$-$C_3$-alkyl, e.g. linear $C_1$-$C_3$-alkyl. It is especially preferred that $R_2$, $R_4$, $R_8$ and $R_{10}$ are the same and are H and $R_1$, $R_3$, $R_5$, $R_7$, $R_9$ and $R_{11}$ are the same and are $C_1$- or $C_2$-alkyl, e.g. $C_1$-alkyl.

In one embodiment, the bis(acyl)phosphinic acid silyl ester of the general formula I is a bis(acyl)phosphinic acid silyl ester, in which $R_1$, $R_3$, $R_5$, $R_7$, $R_9$ and $R_{11}$ in general formula I are the same and $R_2$, $R_4$, $R_8$ and $R_{10}$ are the same. Preferably, $R_1$, $R_3$, $R_5$, $R_7$, $R_9$ and $R_{11}$ in general formula I are the same and are $C_1$-alkyl and $R_2$, $R_4$, $R_8$ and $R_{10}$ are the same and are H. Alternatively, $R_1$, $R_3$, $R_5$, $R_7$, $R_9$ and $R_{11}$ in general formula I are the same and are H and $R_2$, $R_4$, $R_8$ and $R_{10}$ are the same and are $C_1$-alkoxy. Alternatively, $R_1$, $R_3$, $R_5$, $R_7$, $R_9$ and $R_{11}$ in general formula I are the same and are H and $R_2$, $R_4$, $R_8$ and $R_{10}$ are the same and are chloro.

Alternatively, the bis(acyl)phosphinic acid silyl ester of the general formula I is a bis(acyl)phosphinic acid silyl ester, in which $R_1$, $R_3$ and $R_5$ in general formula I are the same, $R_7$, $R_9$ and $R_{11}$ are the same, $R_2$ and $R_4$ are the same and $R_8$ and $R_{10}$ are the same. In this embodiment, $R_1$, $R_3$ and $R_5$ in general formula I are different from $R_7$, $R_9$ and $R_{11}$ and $R_2$ and $R_4$ are different from $R_8$ and $R_{10}$. It is thus appreciated that a mixed bis(acyl)phosphinic acid silyl ester of the general formula I can be prepared by the process of the present invention.

It is appreciated that $R_6$ in the general formula I is $OSiR_{14}R_{15}R_{16}$ with $R_{14}$, $R_{15}$ and $R_{16}$ being independently selected from linear or branched $C_1$-$C_{20}$-alkyl or $C_6$-$C_{12}$-aryl. It is appreciated that $R_{14}$, $R_{15}$ and $R_{16}$ can be the same or different. Preferably, $R_{14}$, $R_{15}$ and $R_{16}$ are the same, For example, $R_{14}$, $R_{15}$ and $R_{16}$ are the same and are linear or branched $C_1$-$C_{20}$-alkyl, preferably linear or branched $C_1$-$C_{18}$-alkyl, more preferably linear or branched $C_1$-$C_{12}$-alkyl and most preferably linear $C_1$-$C_8$-alkyl, e.g. linear $C_1$-$C_8$-alkyl. Preferably, $R_{14}$, $R_{15}$ and $R_{16}$ are the same and are linear or branched $C_1$-$C_6$-alkyl, e.g. linear $C_1$-$C_6$-alkyl, preferably linear or branched $C_1$-$C_4$-alkyl, e.g. linear $C_1$-$C_4$-alkyl, and most preferably linear or branched $C_1$-$C_3$-alkyl, e.g. linear $C_1$-$C_3$-alkyl. It is especially preferred that $R_{14}$, $R_{15}$ and $R_{16}$ are the same and are $C_1$- or $C_2$-alkyl, e.g. $C_1$-alkyl.

Alternatively, $R_{14}$, $R_{15}$ and $R_{16}$ are the same and are phenyl or methylphenyl, preferably phenyl.

In one embodiment, $R_6$ in the general formula I is $OSiR_{14}R_{15}R_{16}$ with $R_{14}$, $R_{15}$ and $R_{16}$ being $C_1$- or $C_2$-alkyl, e.g. $C_1$-alkyl. That is to say, $R_6$ in the general formula I is preferably trimethylsilyloxy.

Thus, it is appreciated that the process of the present invention results in the preparation of the bis(acyl)phosphinic acid silyl ester of the general formula I.

It is appreciated that the bis(acyl)phosphinic acid silyl ester of the general formula I is prepared by a specific process, namely a process allowing the easy preparation of an intermediate product suitable for the conversion into bis(acyl)phosphinic acids.

In particular, the process is characterized in that it comprises the steps of a) heating ammonium hypophosphite with a silylating agent for obtaining a bis(silyl ether)phosphine, and b) reacting the bis(silyl ether)phosphine obtained in step a) with a compound of the general formula IIa and/or IIb,

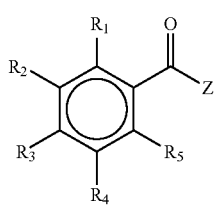

IIa

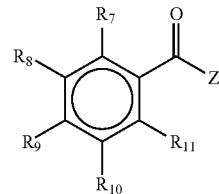

IIb wherein $R_1$, $R_2$, $R_3$, $R_4$ and $R_5$ and/or $R_7$, $R_8$, $R_9$, $R_{10}$ and $R_{11}$ are as defined above; Z is halogen.

Accordingly, in a first step ammonium hypophosphite is heated with a silylating agent. It is to be noted that this step preferably results in the quantitative reaction of the starting materials to the corresponding bis(silyl ether)phosphine. Thus, very high yields and purities and very high conversions are achieved within a few hours, and thus this step advantageously provides a bis(silyl ether)phosphine with high purity for the following process step b).

The silylating agent can be every silylating agent well known in the art. However, in order to obtain advantageous yields in the further process, the silylating agent is preferably a compound of the general formula Va and/or Vb

Va, wherein $R_{14}$, $R_{15}$ and $R_{16}$ are the same or different and are independently selected from linear or branched $C_1$-$C_{20}$-alkyl or $C_6$-$C_{12}$-aryl, and A is selected from halogen, triflate $(OSO_2CF_3)$, cyanide, azide and 1-imidazolyl.

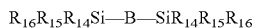

Vb, wherein $R_{14}$, $R_{15}$ and $R_{16}$ are the same or different and are independently selected from linear or branched $C_1$-$C_{20}$-alkyl or $C_6$-$C_{12}$-aryl, and B is selected from O, NH, $NCH_3$, $OC(CH_3)$=N, $OC(CF_3)$=N, NH(C=O)NH, and NH(C=O)O.

With regard to the definition of the $R_{14}$, $R_{15}$ and $R_{16}$ in general formula Va and/or Vb and preferred embodiments thereof, reference is also made to the statements provided above when discussing the technical details of the bis(acyl)phosphinic acid silyl ester of the general formula I, and especially $R_6$, obtained by the process of the present invention.

Preferably, the silylating agent is selected from the group comprising hexamethyldisilazane, trimethylsilyl chloride, trimethylsilyl bromide, trimethylsilyl iodide, triethylsilyl chloride, triethylsilyl bromide, tri-n-propylsilyl chloride, triisopropylsilyl chloride, t-butyldimethylsilyl chloride, bis(trimethylsilyl)acetamide, N,N-bis(trimethylsilyl)methylamine, and mixtures thereof. More preferably, the silylating agent is selected from the group comprising hexamethyldisilazane, N,N-bis(trimethylsilyl)methylamine, trimethylsilyl chloride and mixtures thereof. Most preferably, the silylating agent is hexamethyldisilazane and/or trimethylsilyl chloride. For example, the silylating agent is hexamethyldisilazane or trimethylsilyl chloride, preferably hexamethyldisilazane. Alternatively, the silylating agent is a mixture of hexamethyldisilazane and trimethylsilyl chloride.

It is appreciated that step a) is preferably carried out under an inert gas atmosphere. This is advantageous in order to drive out the only by-product of step a), i.e. ammonia, and thus increases the purity of the bis(silyl ether)phosphine obtained in step a). The inert gas atmosphere may be an argon, helium or nitrogen atmosphere.

It is one requirement of the present invention that the reaction between ammonium hypophosphite and the silylating agent is carried out under heating for accelerating the reaction.

Preferably, step a) is thus carried out at a temperature in the range from 100 to 130° C. For example, step a) is carried out at a temperature in the range from 105 to 125° C. and most preferably in the range from 110 to 120° C.

It is preferred that the equivalent weight ratio of silylating agent to ammonium hypophosphite [silylating agent:ammonium hypophosphite] is from 10:1 to 1:1, more preferably from 8:1 to 1:1, even more preferably from 6:1 to 1:1 and most preferably from 5:1 to 1.5:1.

Step a) can be carried out with or without the addition of a solvent. If step a) is carried out in a solvent, the solvent is preferably an organic solvent, more preferably an aprotic organic solvent. For example, the organic solvent, more preferably the aprotic organic solvent, is selected from the group comprising dichloromethane, tetrachloroethylene, tetrahydrofuran, 1,4-dioxane, toluene, benzene, xylene, and mixtures thereof. Most preferably, the organic solvent, more preferably the aprotic organic solvent, is dichloromethane.

Preferably, step a) is carried out in the absence of an organic solvent. More preferably, step a) is carried out in the absence of a solvent.

Process step a) is preferably carried out under mixing the components, i.e. the silylating agent, ammonium hypophosphite and an optional organic solvent. The skilled man will adapt the mixing conditions (such as the configuration of mixing tools and mixing speed) according to his process equipment.

If step a) is carried out in the absence of a solvent, i.e. after the preparation of the bis(silyl ether)phosphine, an organic solvent, more preferably an aprotic organic solvent, is preferably added before process step b) is carried out. As outlined above, the organic solvent, more preferably the aprotic organic solvent, is selected from the group comprising dichloromethane, tetrachloroethylene, tetrahydrofuran, 1,4-dioxane, toluene, benzene, xylene, and mixtures thereof. Most preferably, the organic solvent, more preferably the aprotic organic solvent, is dichloromethane.

In one embodiment, the bis(silyl ether)phosphine obtained in step a) is thus dissolved in an organic solvent, more preferably an aprotic organic solvent, before process step b) is carried out.

If the bis(silyl ether)phosphine obtained in step a) is mixed with an organic solvent, more preferably an aprotic organic solvent, before process step b) is carried out, the bis(silyl ether)phosphine obtained in step a) is preferably cooled down to a temperature in the range from −5 to 50° C., preferably in the range from 0 to 40° C., more preferably in the range from 0 to 30° C., and most preferably in the range from 0 to 25° C., e.g. from 0 to 10° C., before the organic solvent, more preferably the aprotic organic solvent, is added.

The bis(silyl ether)phosphine obtained in step a) is subjected to process step b). Preferably, the bis(silyl ether)phosphine obtained in step a) is subjected to process step b) without purification and isolation of the silylated product obtained in step a).

In one embodiment, process step a) is repeated one or more times. For example, process step a) is repeated one or two times, e.g. one time.

Preferably, process step a) is carried out in one step and thus is not repeated.

It is appreciated that process steps a) and b) can be performed in a one-pot-reaction. That is to say, the bis(silyl ether)phosphine is prepared in situ, without isolation or purification, and the compound of the general formula IIa and/or IIb is added to the bis(silyl ester)phosphine in the same reactor.

The following process step b) is carried out in that the bis(silyl ether)phosphine obtained in step a) is reacted with a compound of the general formula IIa and/or IIb,

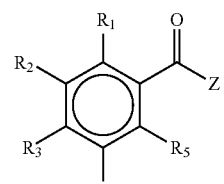

IIa

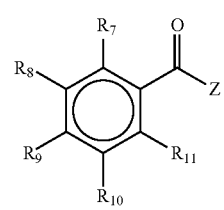

IIb wherein $R_1$, $R_2$, $R_3$, $R_4$ and $R_5$ and/or $R_7$, $R_8$, $R_9$, $R_{10}$ and $R_{11}$ are as defined above; Z is halogen.

With regard to the definition of the $R_1$, $R_2$, $R_3$, $R_4$, $R_5$, $R_7$, $R_8$, $R_9$, $R_{10}$ and $R_{11}$ in general formula IIa and/or IIb and preferred embodiments thereof, reference is made to the statements provided above when discussing the technical details of the bis(acyl)phosphinic acid silyl ester of the general formula I obtained by the process of the present invention.

As regards Z in in general formula IIa and/or IIb, it is appreciated that Z is a halogen. Preferably, Z is selected from chloro, bromo and iodo, more preferably chloro and bromo. Most preferably, Z is chloro.

Thus, in one embodiment the compound of the general formula IIa is a compound wherein $R_1$, $R_2$, $R_3$, $R_4$ and $R_5$ are the same or different and are independently selected from H, halogen, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl and $C_6$-$C_{12}$-aryl and Z is chloro. Preferably, $R_1$, $R_2$, $R_3$, $R_4$ and $R_5$ are the same or different and are independently selected from H, halogen and, linear or branched $C_1$-$C_{20}$-alkyl and Z is chloro. Most preferably, $R_1$, $R_2$, $R_3$, $R_4$ and $R_5$ are the same or different and are independently selected from H and linear or branched $C_1$-$C_{20}$-alkyl and Z is chloro.

Thus, it is preferred that one or more of $R_1$, $R_2$, $R_3$, $R_4$ and $R_5$ is/are H and Z is chloro.

Additionally or alternatively, it is preferred that one or more of $R_1$, $R_2$, $R_3$, $R_4$ and $R_5$ is/are linear or branched $C_1$-$C_{20}$-alkyl, preferably linear or branched $C_1$-$C_{18}$-alkyl, more preferably linear or branched $C_1$-$C_{12}$-alkyl and most preferably linear $C_1$-$C_8$-alkyl, e.g. linear $C_1$-$C_8$-alkyl and Z is chloro. For example, one or more of $R_1$, $R_2$, $R_3$, $R_4$ and $R_5$ is/are linear or branched $C_1$-$C_6$-alkyl, e.g. linear $C_1$-$C_6$-alkyl, preferably linear or branched $C_1$-$C_4$-alkyl, e.g. linear $C_1$-$C_4$-alkyl, and most preferably linear or branched $C_1$-$C_3$-alkyl, e.g. linear $C_1$-$C_3$-alkyl, and Z is chloro. It is especially preferred that one or more of $R_1$, $R_2$, $R_3$, $R_4$ and $R_5$ is/are $C_1$- or $C_2$-alkyl, e.g. $C_1$-alkyl, and Z is chloro.

Preferably, $R_1$, $R_3$ and $R_5$ are the same and Z is chloro. In this embodiment, $R_1$, $R_3$ and $R_5$ are preferably selected from H, halogen, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl, $C_6$-$C_{12}$-aryl, $C_3$-$C_8$-cycloalkoxy, $C_7$-$C_{12}$-arylalkoxy, $C_9$-$C_{15}$-alkenylarylalkoxy, nitro-, $C_6$-$C_{12}$-arylsulfonyl, 4-alkylarylsulfonyl, $C_1$-$C_{20}$-alkylcarboxy, $C_1$-$C_8$-alkoxycarbonyl, $SR_{12}$, $NHR_{12}$ or $NR_{12}R_{13}$ with $R_{12}$ and $R_{13}$ being independently selected from H, linear or branched $C_1$-$C_{20}$-alkyl, linear or branched $C_2$-$C_8$-alkenyl and $C_3$-$C_8$-cycloalkyl, and an O-, S- or N-containing 5- or 6-membered heterocyclic ring, and Z is chloro. For example, $R_1$, $R_3$ and $R_5$ are the same and are selected from linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl and an O-, S- or N-containing 5- or 6-membered heterocyclic ring, and Z is chloro.

In one embodiment, $R_1$, $R_3$ and $R_5$ are the same and are linear or branched $C_1$-$C_{20}$-alkyl, preferably linear or branched $C_1$-$C_{18}$-alkyl, more preferably linear or branched $C_1$-$C_{12}$-alkyl and most preferably linear $C_1$-$C_8$-alkyl, e.g. linear $C_1$-$C_8$-alkyl, and Z is chloro. For example, $R_1$, $R_3$ and $R_5$ are the same and are linear or branched $C_1$-$C_6$-alkyl, e.g. linear $C_1$-$C_6$-alkyl, preferably linear or branched $C_1$-$C_4$-alkyl, e.g. linear $C_1$-$C_4$-alkyl, and most preferably linear or branched $C_1$-$C_3$-alkyl, e.g. linear $C_1$-$C_3$-alkyl, and Z is chloro. It is especially preferred that $R_1$, $R_3$ and $R_5$ are the same and are $C_1$- or $C_2$-alkyl, e.g. $C_1$-alkyl, and Z is chloro.

In one embodiment, $R_2$ and $R_4$ are the same and Z is chloro. In this embodiment, $R_2$ and $R_4$ are preferably selected from H, halogen, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl, $C_6$-$C_{12}$-aryl, $C_3$-$C_8$-cycloalkoxy, $C_7$-$C_{12}$-arylalkoxy, $C_9$-$C_{15}$-alkenylarylalkoxy, nitro-, $C_6$-$C_{12}$-arylsulfonyl, 4-alkylarylsulfonyl, $C_1$-$C_{20}$-alkylcarboxy, $C_1$-$C_8$-alkoxycarbonyl, $SR_{12}$, $NHR_{12}$ or $NR_{12}R_{13}$ with $R_{12}$ and $R_{13}$ being independently selected from H, linear or branched $C_1$-$C_{20}$-alkyl, linear or branched $C_2$-$C_8$-alkenyl and $C_3$-$C_8$-cycloalkyl, and an O-, S- or N-containing 5- or 6-membered heterocyclic ring, and Z is chloro. For example, $R_2$ and $R_4$ are the same and are selected from H, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl and an O-, S- or N-containing 5- or 6-membered heterocyclic ring, and Z is chloro.

In one embodiment, $R_2$ and $R_4$ are the same and are H, and Z is chloro.

It is appreciated that $R_2$ and $R_4$ are preferably different from $R_1$, $R_3$ and $R_5$. Thus, if $R_2$ and $R_4$ are different from $R_1$, $R_3$, and $R_5$, $R_2$ and $R_4$ are preferably the same and are H and $R_1$, $R_3$ and $R_5$ are the same and are linear or branched $C_1$-$C_{20}$-alkyl, preferably linear or branched $C_1$-$C_{18}$-alkyl, more preferably linear or branched $C_1$-$C_{12}$-alkyl and most preferably linear $C_1$-$C_8$-alkyl, e.g. linear $C_1$-$C_8$-alkyl, and Z is chloro. For example, $R_2$ and $R_4$ are the same and are H and $R_1$, $R_3$ and $R_5$ are the same and are linear or branched $C_1$-$C_6$-alkyl, e.g. linear $C_1$-$C_6$-alkyl, preferably linear or branched $C_1$-$C_4$-alkyl, e.g. linear $C_1$-$C_4$-alkyl, and most preferably linear or branched $C_1$-$C_3$-alkyl, e.g. linear $C_1$-$C_3$-alkyl, and Z is chloro. It is especially preferred that $R_2$ and $R_4$ are the same and are H and $R_1$, $R_3$ and $R_5$ are the same and are $C_1$- or $C_2$-alkyl, e.g. $C_1$-alkyl, and Z is chloro.

Alternatively, if $R_2$ and $R_4$ are different from $R_1$, $R_3$, and $R_5$, $R_2$ and $R_4$ are preferably the same and are $C_1$-$C_8$-alkoxy, preferably $C_1$-$C_4$-alkoxy, more preferably $C_1$-$C_2$-alkoxy, e.g. $C_1$-alkoxy, or halogen, preferably, chloro, bromo or iodo, more preferably chloro or bromo, e.g. chloro, and $R_1$, $R_3$ and $R_5$ are the same and are H, and Z is chloro. It is especially preferred that $R_2$ and $R_4$ are the same and are $C_1$-alkoxy and $R_1$, $R_3$ and $R_5$ are the same and are H, and Z is chloro. Alternatively, $R_2$ and $R_4$ are the same and are chloro and $R_1$, $R_3$ and $R_5$ are the same and are H, and Z is chloro.

As regards $R_7$, $R_8$, $R_9$, $R_{10}$ and $R_{11}$ in the general formula IIb, it is to be noted that they can be the same or different. Preferably, $R_7$, $R_8$, $R_9$, $R_{10}$ and $R_{11}$ are the same or different and are independently selected from H, halogen, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl, $C_6$-$C_{12}$-aryl, $C_3$-$C_8$-cycloalkoxy, $C_7$-$C_{12}$-arylalkoxy, $C_9$-$C_{15}$-alkenylarylalkoxy, nitro-, $C_6$-$C_{12}$-arylsulfonyl, 4-alkylarylsulfonyl, $C_1$-$C_{20}$-alkylcarboxy, $C_1$-$C_8$-alkoxycarbonyl, $SR_{12}$, $NHR_{12}$ or $NR_{12}R_{13}$ with $R_{12}$ and $R_{13}$ being independently selected from H, linear or branched $C_1$-$C_{20}$-alkyl, linear or branched $C_2$-$C_8$-alkenyl and $C_3$-$C_8$-cycloalkyl, and an O-, S- or N-containing 5- or 6-membered heterocyclic ring, and Z is chloro.

In one embodiment, $R_7$, $R_8$, $R_9$, $R_{10}$ and $R_{11}$ in the general formula IIb are the same or different and are independently selected from H, halogen, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl and $C_6$-$C_{12}$-aryl, and Z is chloro. Preferably, $R_7$, $R_8$, $R_9$, $R_{10}$ and $R_{11}$ are the same or different and are independently selected from H, halogen and, linear or branched $C_1$-$C_{20}$-alkyl, and Z is chloro. Most preferably, $R_7$, $R_8$, $R_9$, $R_{10}$ and $R_{11}$ are the same or different and are independently selected from H and, linear or branched $C_1$-$C_{20}$-alkyl, and Z is chloro.

Thus, it is preferred that one or more of $R_7$, $R_8$, $R_9$, $R_{10}$ and $R_{11}$ is/are H and Z is chloro.

Additionally or alternatively, it is preferred that one or more of $R_7$, $R_8$, $R_9$, $R_{10}$ and $R_{11}$ is/are linear or branched $C_1$-$C_{20}$-alkyl, preferably linear or branched $C_1$-$C_{18}$-alkyl, more preferably linear or branched $C_1$-$C_{12}$-alkyl and most preferably linear $C_1$-$C_8$-alkyl, e.g. linear $C_1$-$C_8$-alkyl, and Z is chloro. For example, one or more of $R_7$, $R_8$, $R_9$, $R_{10}$ and $R_{11}$ is/are linear or branched $C_1$-$C_6$-alkyl, e.g. linear $C_1$-$C_6$-alkyl, preferably linear or branched $C_1$-$C_4$-alkyl, e.g. linear $C_1$-$C_4$-alkyl, and most preferably linear or branched $C_1$-$C_3$-alkyl, e.g. linear $C_1$-$C_3$-alkyl, and Z is chloro. It is especially preferred that one or more of $R_7$, $R_8$, $R_9$, $R_{10}$ and $R_{11}$ is/are $C_1$- or $C_2$-alkyl, e.g. $C_1$-alkyl, and Z is chloro.

Preferably, $R_7$, $R_9$ and $R_{11}$ are the same and Z is chloro. In this embodiment, $R_7$, $R_9$ and $R_{11}$ are preferably selected from H, halogen, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl, $C_6$-$C_{12}$-aryl, $C_3$-$C_8$-cycloalkoxy, $C_7$-$C_{12}$-arylalkoxy, $C_9$-$C_{15}$-alkenylarylalkoxy, nitro-, $C_6$-$C_{12}$-arylsulfonyl, 4-alkylarylsulfonyl, $C_1$-$C_{20}$-alkylcarboxy, $C_1$-$C_8$-alkoxycarbonyl, $SR_{12}$, $NHR_{12}$ or $NR_{12}R_{13}$ with $R_{12}$ and $R_{13}$ being independently selected from H, linear or branched $C_1$-$C_{20}$-alkyl, linear or branched $C_2$-$C_8$-alkenyl and $C_3$-$C_8$-cycloalkyl, and an O-, S- or N-containing 5- or 6-membered heterocyclic ring, and Z is chloro. For example, $R_7$, $R_9$ and $R_{11}$ are the same and are selected from linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl and an O-, S- or N-containing 5- or 6-membered heterocyclic ring, and Z is chloro.

In one embodiment, $R_7$, $R_9$ and $R_{11}$ are the same and are linear or branched $C_1$-$C_{20}$-alkyl, preferably linear or branched $C_1$-$C_{18}$-alkyl, more preferably linear or branched $C_1$-$C_{12}$-alkyl and most preferably linear $C_1$-$C_8$-alkyl, e.g. linear $C_1$-$C_8$-alkyl, and Z is chloro. For example, $R_7$, $R_9$ and $R_{11}$ are the same and are linear or branched $C_1$-$C_6$-alkyl, e.g. linear $C_1$-$C_6$-alkyl, preferably linear or branched $C_1$-$C_4$-alkyl, e.g. linear $C_1$-$C_4$-alkyl, and most preferably linear or branched $C_1$-$C_3$-alkyl, e.g. linear $C_1$-$C_3$-alkyl, and Z is chloro. It is especially preferred that $R_7$, $R_9$ and $R_{11}$ are the same and are $C_1$- or $C_2$-alkyl, e.g. $C_1$-alkyl, and Z is chloro.

In one embodiment, $R_8$ and $R_{10}$ are the same and Z is chloro. In this embodiment, $R_8$ and $R_{10}$ are preferably selected from H, halogen, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl, $C_6$-$C_{12}$-aryl, $C_3$-$C_8$-cycloalkoxy, $C_7$-$C_{12}$-arylalkoxy, $C_9$-$C_{15}$-alkenylarylalkoxy, nitro-, $C_6$-$C_{12}$-arylsulfonyl, 4-alkylarylsulfonyl, $C_1$-$C_{20}$-alkylcarboxy, $C_1$-$C_8$-alkoxycarbonyl, $SR_{12}$, $NHR_{12}$ or $NR_{12}R_{13}$ with $R_{12}$ and $R_{13}$ being independently selected from H, linear or branched $C_1$-$C_{20}$-alkyl, linear or branched $C_2$-$C_8$-alkenyl and $C_3$-$C_8$-cycloalkyl, and an O-, S- or N-containing 5- or 6-membered heterocyclic ring, and Z is chloro. For example, $R_8$ and $R_{10}$ are the same and are selected from H, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl and an O-, S- or N-containing 5- or 6-membered heterocyclic ring, and Z is chloro.

In one embodiment, $R_8$ and $R_{10}$ are the same and are H and Z is chloro.

It is appreciated that $R_8$ and $R_{10}$ are preferably different from $R_7$, $R_9$ and $R_{11}$. Thus, if $R_8$ and $R_{10}$ are different from $R_7$, $R_9$ and $R_{11}$, $R_8$ and $R_{10}$ are preferably the same and are H and $R_7$, $R_9$ and $R_{11}$ are the same and are linear or branched $C_1$-$C_{20}$-alkyl, preferably linear or branched $C_1$-$C_{18}$-alkyl, more preferably linear or branched $C_1$-$C_{12}$-alkyl and most preferably linear $C_1$-$C_8$-alkyl, e.g. linear $C_1$-$C_8$-alkyl, and Z is chloro. For example, $R_8$ and $R_{10}$ are the same and are H and $R_7$, $R_9$ and $R_{11}$ are the same and are linear or branched $C_1$-$C_6$-alkyl, e.g. linear $C_1$-$C_6$-alkyl, preferably linear or branched $C_1$-$C_4$-alkyl, e.g. linear $C_1$-$C_4$-alkyl, and most preferably linear or branched $C_1$-$C_3$-alkyl, e.g. linear $C_1$-$C_3$-alkyl, and Z is chloro. It is especially preferred that $R_8$ and $R_{10}$ are the same and are H and $R_7$, $R_9$ and $R_{11}$ are the same and are $C_1$- or $C_2$-alkyl, e.g. $C_1$-alkyl, and Z is chloro.

Alternatively, if $R_8$ and $R_{10}$ are different from $R_7$, $R_9$ and $R_{11}$, $R_8$ and $R_{10}$ are preferably the same and are $C_1$-$C_8$-alkoxy, preferably $C_1$-$C_4$-alkoxy, more preferably $C_1$-$C_2$-alkoxy, e.g. $C_1$-alkoxy, or halogen, preferably, chloro, bromo or iodo, more preferably chloro or bromo, e.g. chloro, and $R_7$, $R_9$ and $R_{11}$ are the same and are H, and Z is chloro. It is especially preferred that $R_8$ and $R_{10}$ are the same and are $C_1$-alkoxy and $R_7$, $R_9$ and $R_{11}$ are the same and are H, and Z is chloro. Alternatively, $R_8$ and $R_{10}$ are the same and are chloro and $R_7$, $R_9$ and $R_{11}$ are the same and are H, and Z is chloro.

In one embodiment, the bis(silyl ether)phosphine obtained in step a) is reacted with a compound of the general formula IIa (or IIb), wherein $R_1$, $R_3$ and $R_5$ (or $R_7$, $R_9$ and $R_{11}$) are the same and $R_2$ and $R_4$ (or $R_8$ and $R_{10}$) are the same and Z is chloro. Preferably, $R_1$, $R_3$ and $R_5$ in general formula IIa (or $R_7$, $R_9$ and $R_{11}$ in general formula IIb) are the same and are $C_1$-alkyl and $R_2$ and $R_4$ (or $R_8$ and $R_{10}$) are the same and are H and Z is chloro. Alternatively, $R_1$, $R_3$ and $R_5$ in general formula IIa (or $R_7$, $R_9$ and $R_{11}$ in general formula IIb) are the same and are H and $R_2$ and $R_4$ (or $R_8$ and $R_{10}$) are the same and are $C_1$-alkoxy, and Z is chloro. Alternatively, $R_1$, $R_3$ and $R_5$ in general formula IIa (or $R_7$, $R_9$ and $R_{11}$ in general formula IIb) are the same and are H and $R_2$ and $R_4$ (or $R_8$ and $R_{10}$) are the same and are chloro, and Z is chloro. It is appreciated that this embodiment specifically results in the corresponding symmetric bis(acyl)phosphinic acid silyl ester of the general formula I, i.e. $R_1$, $R_3$, $R_5$, $R_7$, $R_9$ and $R_{11}$ are the same and $R_2$, $R_4$, $R_8$ and $R_{10}$ are the same.

Alternatively, the bis(acyl)phosphinic acid silyl ester obtained in step a) is mixed with a compound of the general formula IIa and IIB, in which $R_1$, $R_3$ and $R_5$ in general formula IIa are the same, $R_7$, $R_9$ and $R_{11}$ in general formula IIb are the same, $R_2$ and $R_4$ in general formula IIa are the same and $R_8$ and $R_{10}$ in general formula IIb are the same and Z is chloro. In this embodiment, $R_1$, $R_3$ and $R_5$ in general formula IIa are different from $R_7$, $R_9$ and $R_{11}$ in general formula IIb and $R_2$ and $R_4$ in general formula IIa are different from $R_8$ and $R_{10}$ in general formula IIb and Z is chloro. It is thus appreciated that a mixed bis(acyl)phosphinic acid silyl ester of the general formula I is obtained if compounds of the general formula IIa and IIB are added in step b) of the present process.

Step b) of the process of the present invention can be carried out over a wide temperature range. Thus, process step b) is preferably carried out at a temperature in the range from −5 to 50° C., preferably in the range from 0 to 40° C., more preferably in the range from 0 to 30° C., and most preferably in the range from 0 to 25° C.

The compound of the general formula IIa and/or IIb is preferably added dropwise to the bis(silyl ether)phosphine obtained in step a). The dropwise addition of the compound of the general formula IIa and/or IIb is preferably carried out at a temperature in the range from 0 to 25° C., e.g. from 0 to 10° C.

It is preferred that the reaction of the compound of the general formula IIa and/or IIb with the bis(silyl ether)phosphine obtained in step a), i.e. after the addition of the compound of the general formula IIa and/or IIb, can be carried out at a temperature above the temperature used for adding the compound of the general formula IIa and/or IIb. Thus, the reaction of the compound of the general formula IIa and/or IIb with the bis(silyl ether)phosphine obtained in step a), i.e. after the addition of the compound of the general formula IIa and/or IIb, is preferably carried out at a temperature in the range from 0 to 25° C., e.g. from 10 to 25° C. In one embodiment, the reaction of the compound of the general formula IIa and/or IIb with the bis(silyl ether)phosphine obtained in step a), i.e. after the addition of the compound of the general formula IIa and/or IIb, is carried out at about room temperature, i.e. 21° C.±2° C.

In view of the statements provided above with regard to process step a), it is appreciated that step b) is preferably carried out in the presence of an organic solvent, preferably an aprotic organic solvent, e.g. dichloromethane.

It is appreciated that the compound of the general formula IIa and/or IIb is preferably added in step b) in an excess to the ammonium hypophosphite of step a), based on the equivalent weight ratio.

It is preferred that the equivalent weight ratio of the compound of the general formula IIa and/or IIb to the ammonium hypophosphite of step a) [IIa and/or IIb:P-compound] is in the range from 3.5:1 to 1.5:1 and preferably in the range from 2.5:1 to 1.8:1.

Process step b) is preferably carried out under mixing the components, i.e. the silylating agent, the of the general formula IIa and/or IIb and the optional organic solvent. The skilled man will adapt the mixing conditions (such as the configuration of mixing tools and mixing speed) according to his process equipment.

In one embodiment, process step b) is carried out without the addition of further additives.

Alternatively, process step b) is carried out in the presence of further additives. For example, trimethylamine can be added in order to increase the reactivity of the silylating agent.

It is appreciated that process step b) can be repeated one or more times. Preferably, process step b) is repeated one or two times, e.g. one time.

Accordingly, process step b) can be carried out in a one step procedure, i.e. without repeating the addition of the compound of the general formula IIa and/or IIb, or in a stepwise procedure, repeating the addition of the silylating agent followed by the compound of the general formula IIa and/or IIb. If process step b) is carried out in a stepwise procedure, process step b) is thus repeated, preferably two times.

It is appreciated that the stepwise procedure is especially advantageous for a controlled preparation of a bis(acyl) phosphinic acid silyl ester of the general formula I in high yield as the total stoichiometrically required amount of the silylating agent is not added at once. Furthermore, the stepwise procedure allows the preparation of a defined mixed bis(acyl)phosphinic acid silyl ester of the general formula I. That is to say, the stepwise procedure is preferred if a bis(acyl)phosphinic acid silyl ester of the general formula I is prepared, in which $R_1$, $R_3$ and $R_5$ are the same, $R_7$, $R_9$ and $R_{11}$ are the same, $R_2$ and $R_4$ are the same and $R_8$ and $R_{10}$ are the same. Furthermore, $R_1$, $R_3$ and $R_5$ in general formula I are different from $R_7$, $R_9$ and $R_{11}$ and $R_2$ and $R_4$ are different from $R_8$ and $R_{10}$.

In one embodiment, the stepwise procedure allows the preparation of a bis(acyl)phosphinic acid silyl ester of the general formula I, in which $R_1$, $R_2$, $R_3$, $R_4$, $R_5$, $R_6$, $R_7$, $R_8$, $R_9$, $R_{10}$ and $R_{11}$ are the same or different.

Preferably, process step b) is carried out in an one step procedure, i.e. without repeating the addition of the compound of the general formula IIa and/or IIb.

It is appreciated that the bis(acyl)phosphinic acid silyl ester obtained in step b) may be further treated by
i) separating the obtained bis(acyl)phosphinic acid silyl ester of the general formula I from by-products and/or educts and/or solvent, and/or
ii) washing the obtained bis(acyl)phosphinic acid silyl ester of the general formula I.

Additionally, the bis(acyl)phosphinic acid silyl ester of the general formula I obtained in step b) may be subjected to a drying step.

Thus, the process of the present invention may comprise further steps for isolating and/or purifying the obtained bis(acyl)phosphinic acid silyl ester of the general formula I Such steps are well known in the art and will be adapted by the skilled person according to the process conditions and equipment used for carrying out the process of the present invention.

In one embodiment, the process comprises a further step c) of mixing the bis(acyl)phosphinic acid silyl ester obtained in step b) with ethanol such as to obtain a bis(acyl)phosphinic acid of the general formula III

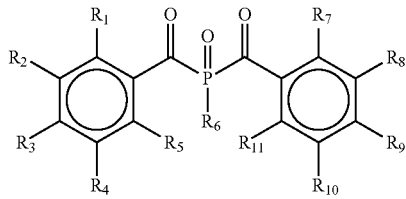

wherein $R_1$, $R_2$, $R_3$, $R_4$, $R_5$, $R_7$, $R_8$, $R_9$, $R_{10}$ and $R_{11}$ are the same or different and are independently selected from H, halogen, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl, $C_6$-$C_{12}$-aryl, $C_3$-$C_8$-cycloalkoxy, $C_7$-$C_{12}$-arylalkoxy, $C_9$-$C_{15}$-alkenylarylalkoxy, nitro-, $C_6$-$C_{12}$-arylsulfonyl, 4-alkylarylsulfonyl, $C_1$-$C_{20}$-alkylcarboxy, $C_1$-$C_8$-alkoxycarbonyl, $SR_{12}$, $NHR_{12}$ or $NR_{12}R_{13}$ with $R_{12}$ and $R_{13}$ being independently selected from H, linear or branched $C_1$-$C_{20}$-alkyl, linear or branched $C_2$-$C_8$-alkenyl and $C_3$-$C_8$-cycloalkyl, and an O-, S- or N-containing 5- or 6-membered heterocyclic ring; $R_6$ is OH With regard to the definition of the $R_1$, $R_2$, $R_3$, $R_4$, $R_5$, $R_7$, $R_8$, $R_9$, $R_{10}$ and $R_{11}$ in general formula III and preferred embodiments thereof, reference is made to the statements provided above when discussing the technical details of the bis(acyl)phosphinic acid silyl ester of the general formula I obtained by the process of the present invention.

It is appreciated that the bis(acyl)phosphinic acid of the general formula III is prepared by a specific process, namely a process avoiding the use of metallic sodium or lithium in combination with undesirable phosphorus compounds such as white phosphorus, red phosphorus, phosphorus trichloride, alkyl or aryl phosphine, or dialkyl or diaryl phosphine. Furthermore, the bis(acyl)phosphinic acid of the general formula III can be easily prepared from the bis(acyl)phosphinic acid silyl ester of the general formula I.

For obtaining the bis(acyl)phosphinic acid of the general formula III, subsequently to step b), the bis(acyl)phosphinic acid silyl ester obtained in step b) is hydrolysed.

It is appreciated that hydrolyzing of the bis(acyl)phosphinic acid silyl ester obtained in step b) can be achieved by using water and/or an alcohol, such as methanol, ethanol, propanol. Preferably, step c) is carried out by adding ethanol.

If the process of the present invention comprises step c), it is appreciated that process steps a), b) and c) can be performed in a one-pot-reaction. That is to say, the bis(silyl ether)phosphine is prepared in situ, without isolation or purification, the compound of the general formula IIa and/or IIb is added to the bis(silyl ester)phosphine in the same reactor, without isolation or purification, and the obtained bis(acyl)phosphinic acid silyl ester is hydrolysed in the same reactor.

Step c) of the process of the present invention can be carried out over a wide temperature range. However, for avoiding the formation of unwanted by-products, step c) is preferably carried out at a temperature in the range from −5 to 50° C., preferably in the range from 0 to 40° C., more preferably in the range from 0 to 30° C., and most preferably in the range from 2 to 28° C. For example, process step c) is carried out at a temperature in the range from 5 to 25° C.

Subsequent to process step c) of mixing the bis(acyl) phosphinic acid silyl ester obtained in step b) with ethanol, the process may comprise further steps for isolating and/or purifying the obtained bis(acyl)phosphinic acid of the general formula III.

For example, the process may further comprise a step of
i) separating the obtained bis(acyl)phosphinic acid of the general formula III from the solvent, and/or
ii) washing the obtained bis(acyl)phosphinic acid of the general formula III.

In one embodiment, the process further comprises the steps of
i) separating the obtained bis(acyl)phosphinic acid of the general formula III from the solvent, and
ii) washing the obtained bis(acyl)phosphinic acid of the general formula III.

Additionally, the process may further comprise a step of drying the obtained bis(acyl)phosphinic acid of the general formula III.

Such steps are well known in the art and will be adapted by the skilled person according to the process conditions and equipment used for carrying out the process of the present invention.

In one embodiment, the process comprises a further step d) of halogenating, preferably chlorinating, the bis(acyl) phosphinic acid of the general formula III obtained in step c) for obtaining a compound of the general formula IV

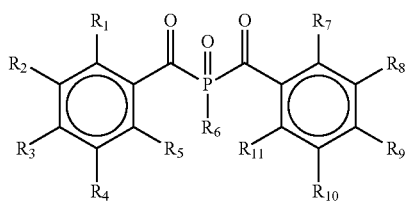

IV wherein $R_1$, $R_2$, $R_3$, $R_4$, $R_5$, $R_7$, $R_8$, $R_9$, $R_{10}$ and $R_{11}$ are the same or different and are independently selected from H, halogen, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl, $C_6$-$C_{12}$-aryl, $C_3$-$C_8$-cycloalkoxy, $C_7$-$C_{12}$-arylalkoxy, $C_9$-$C_{15}$-alkenylarylalkoxy, nitro-, $C_6$-$C_{12}$-arylsulfonyl, 4-alkylarylsulfonyl, $C_1$-$C_{20}$-alkylcarboxy, $C_1$-$C_8$-alkoxycarbonyl, $SR_{12}$, $NHR_{12}$ or $NR_{12}R_{13}$ with $R_{12}$ and $R_{13}$ being independently selected from H, linear or branched $C_1$-$C_{20}$-alkyl, linear or branched $C_2$-$C_8$-alkenyl and $C_3$-$C_8$-cycloalkyl, and an O-, S- or N-containing 5- or 6-membered heterocyclic ring; $R_6$ is halogen, preferably selected from chloro, bromo and iodo, more preferably chloro.

With regard to the definition of the $R_1$, $R_2$, $R_3$, $R_4$, $R_5$, $R_7$, $R_8$, $R_9$, $R_{10}$ and $R_{11}$ in general formula IV and preferred embodiments thereof, reference is made to the statements provided above when discussing the technical details of the bis(acyl)phosphinic acid silyl ester of the general formula I obtained by the process of the present invention.

Such halogenation reactions resulting in the halogenation of the bis(acyl)phosphinic acid of the general formula III are well known in the art and can be adapted by the skilled person according to the specific reaction and equipment used for carrying out the process of the present invention.

In another aspect, the present invention refers to a bis(acyl)phosphinic acid silyl ester of the general formula I,

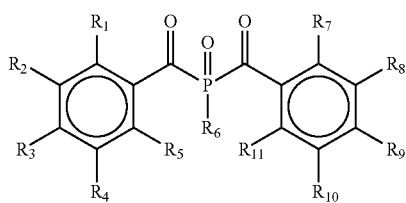

I wherein $R_1$, $R_2$, $R_3$, $R_4$, $R_5$, $R_7$, $R_8$, $R_9$, $R_{10}$ and $R_{11}$ are the same or different and are independently selected from H, halogen, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl, $C_6$-$C_{12}$-aryl, $C_3$-$C_8$-cycloalkoxy, $C_7$-$C_{12}$-arylalkoxy, $C_9$-$C_{15}$-alkenylarylalkoxy, nitro-, $C_6$-$C_{12}$-arylsulfonyl, 4-alkylarylsulfonyl, $C_1$-$C_{20}$-alkylcarboxy, $C_1$-$C_8$-alkoxycarbonyl, $SR_{12}$, $NHR_{12}$ or $NR_{12}R_{13}$ with $R_{12}$ and $R_{13}$ being independently selected from H, linear or branched $C_1$-$C_{20}$-alkyl, linear or branched $C_2$-$C_8$-alkenyl and $C_3$-$C_8$-cycloalkyl, and an O-, S- or N-containing 5- or 6-membered heterocyclic ring; $R_6$ is $OSiR_{14}R_{15}R_{16}$ with $R_{14}$, $R_{15}$ and $R_{16}$ being independently selected from linear or branched $C_1$-$C_{20}$-alkyl or $C_6$-$C_{12}$-aryl. The bis(acyl)phosphinic acid silyl ester of the general formula I is preferably obtained by the process of the present invention.

With regard to the definition of the process, $R_1$, $R_2$, $R_3$, $R_4$, $R_5$, $R_6$, $R_7$, $R_8$, $R_9$, $R_{10}$ and $R_{11}$ in general formula I and preferred embodiments thereof, reference is made to the statements provided above when discussing the technical details of the process as well as the bis(acyl)phosphinic acid silyl ester of the general formula I obtained by the process of the present invention.

It is appreciated that the bis(acyl)phosphinic acid silyl ester of the general formula I obtained by the process of the present invention is preferably used for the preparation of bis(acyl)phosphinic acids.

In a further aspect, the present invention refers to a bis(acyl)phosphinic acid of the general formula III,

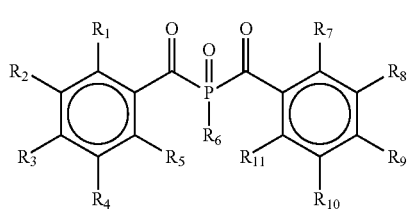

III wherein $R_1$, $R_2$, $R_3$, $R_4$, $R_5$, $R_7$, $R_8$, $R_9$, $R_{10}$ and $R_{11}$ are the same or different and are independently selected from H, halogen, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl, $C_6$-$C_{12}$-aryl, $C_3$-$C_8$-cycloalkoxy, $C_7$-$C_{12}$-arylalkoxy, $C_9$-$C_{15}$-alkenylarylalkoxy, nitro-, $C_6$-$C_{12}$-arylsulfonyl, 4-alkylarylsulfonyl, $C_1$-$C_{20}$-alkylcarboxy, $C_1$-$C_8$-alkoxycarbonyl, $SR_{12}$, $NHR_{12}$ or $NR_{12}R_{13}$ with $R_{12}$ and $R_{13}$ being independently selected from H, linear or branched $C_1$-$C_{20}$-alkyl, linear or branched $C_2$-$C_8$-alkenyl and $C_3$-$C_8$-cycloalkyl, and an O-, S- or N-containing 5- or 6-membered heterocyclic ring; $R_6$ is OH. The bis(acyl)phosphinic acid of the general formula III is preferably obtained by the process of the present invention.

With regard to the definition of the process, $R_1$, $R_2$, $R_3$, $R_4$, $R_5$, $R_6$, $R_7$, $R_8$, $R_9$, $R_{10}$ and $R_{11}$ in general formula III and preferred embodiments thereof, reference is made to the statements provided above when discussing the technical details of the process as well as the bis(acyl)phosphinic acid silyl ester of the general formula I and the bis(acyl)phosphinic acid of the general formula III obtained by the process of the present invention.

It is appreciated that the bis(acyl)phosphinic acid of the general formula III obtained by the process of the present invention is preferably used in a photopolymerizable composition together with at least one photopolymerizable unsaturated compound.

A further aspect of the present invention thus refers to a photopolymerizable composition comprising the bis(acyl) phosphinic acid of the general formula III and at least one photopolymerizable unsaturated compound.

It is appreciated that any photopolymerizable unsaturated compound that is typically used in the articles to be prepared and is well known can be used as the at least one photopolymerizable unsaturated compound. For example, the at least one photopolymerizable unsaturated compound can be a compound as described in WO 2004/099262 A1 which is thus incorporated herewith by reference.

The photopolymerizable composition may also contain optional additives and/or optional further photoinitiators and/or coinitiator. The optional additives and/or photoinitiators and/or coinitiator are not limited any include any additive and/or photoinitiators and/or coinitiator typically used in the articles to be prepared and are well known in the art. For example, the additives and/or photoinitiators and/or coinitiator can be one or more compounds described as additives (C) and/or photoinitiators and/or coinitiator (D) in WO 2004/099262 A1 which is thus incorporated herewith by reference.

The scope and interest of the invention will be better understood based on the following examples which are intended to illustrate certain embodiments of the invention and are non-limitative.

EXAMPLES

Example 1: Synthesis of Bis(2,4,6-trimethylbenzoyl)phosphinic Acid, Stepwise Procedure Ammonium hypophosphite (20.0 g, 0.241 mol, 1 eq) was suspended in 68.04 g (0.422 mol, 1.75 eq) 1,1,1,3,3,3-hexamethyldisilazane and stirred at 110-120° C. until ammonia evolution ceased and the ammonium hypophosphite was completely dissolved. The reaction mixture was cooled down to 5° C. in an ice bath and diluted with 200 mL of dichloromethane. 44.44 g (0.243 mol, 1.01 eq) 2,4,6-trimethylbenzoyl chloride was added dropwise and the reaction mixture stirred overnight at room temperature. The flask was again cooled down in an ice bath and another 68.04 g (0.422 mol, 1.75 eq) of 1,1,1,3,3,3-hexamethyldisilazane were quickly added. After three hours of stirring at 5° C., 44.44 g (0.243 mol, 1.01 eq) 2,4,6-trimethylbenzoyl chloride was added dropwise and left overnight with stirring at room temperature. The reaction mass was then cooled down to 0-5° C. and hydrolyzed by dropwise addition of 200 mL ethanol, so that the temperature did not exceed 15° C. After filtration, the residue was thoroughly washed with ethanol and the filtrate evaporated to dryness. To the yellow viscous oil was added TBME:hexane 1:1. After the product had crystallized, the slightly yellow solid was filtered, washed with cold hexane and dried.

Yield: 53.8 g of a pale yellow solid, 62% of theory
$^1$H-NMR (400.13 MHz; CDCl$_3$): δ (ppm)=2.13 (s, 12H), 2.26 (s, 6H), 6.77 (s, 4H), 9.53 (bs, 1H)
$^{31}$P-NMR (161.89 MHz; CDCl$_3$): δ (ppm)=−3.67
$^{13}$C-NMR (100.62 MHz; CDCl$_3$): (ppm) δ=19.25, 21.15, 128.70, 135.15, 136.23 (d, $^3J_{PC}$ 45.5 Hz), 140.23, 216.80 (d, $^1J_{PC}$ 101.2 Hz)

The total formula was confirmed by elemental analysis. The elemental analysis was carried out by a standard procedure.

Example 2: Synthesis of Bis(2,4,6-trimethylbenzoyl)phosphinic Acid, One-Step Procedure Ammonium hypophosphite (20.0 g, 0.241 mol, 1 eq) were suspended in 136.07 g (0.843 mol, 3.5 eq) 1,1,1,3,3,3-hexamethyldisilazane and stirred at 110-120° C. until ammonia evolution ceased and the ammonium hypophosphite dissolved completely. The reaction mixture was cooled down to 5° C. in an ice bath and diluted with 200 mL of dichloromethane. 90.19 g (0.494 mol, 2.05 eq) 2,4,6-trimethylbenzoyl chloride was added dropwise and the reaction mixture was stirred overnight at room temperature until $^{31}$P-NMR showed complete conversion. Subsequently, the reaction mass was cooled to 0-5° C. and hydrolyzed by dropwise addition of 300 mL ethanol so that the temperature did not exceed 25° C. After filtration, the residue was thoroughly washed with dichloromethane:ethanol 1:1 and the filtrate evaporated to dryness. The residue was dissolved in ethyl acetate and washed twice with dilute hydrochloric acid. The organic phase was dried and evaporated. The crude solid product was recrystallized from a mixture of heptane:toluene 1:4 filtered, washed with heptane and dried to give bis(2,4,6-trimethylbenzoyl)phosphinic acid as a pale yellow solid.

Yield: 62.1 g pale yellow solid, 72% of theory
$^1$H-NMR (400.13 MHz; CDCl$_3$): δ=2.13 (s, 12H), 2.32 (s, 6H), 6.97 (s, 4H), 12.65 (bs, 1H)
$^{31}$P-NMR (161.89 MHz; CDCl$_3$): δ=−2.97
$^{13}$C-NMR (100.62 MHz; CDCl$_3$): δ=19.14, 21.27, 128.79, 135.26 (d, $^2J_{PC}$ 46.5 Hz), 135.46, 140.67, 213.72 (d, $^1J_{PC}$ 98.7 Hz)

Correct elemental analysis was obtained. The elemental analysis was carried out by a standard procedure.

The invention claimed is:
1. A process for the preparation of a bis(acyl)phosphinic acid silyl ester of the general formula I:

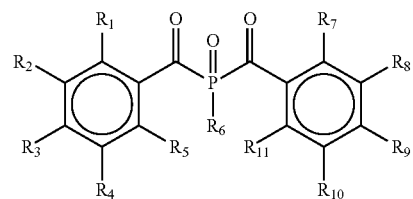

wherein R$_1$, R$_2$, R$_3$, R$_4$, R$_5$, R$_7$, R$_8$, R$_9$, R$_{10}$ and R$_{11}$ are the same or different and are independently selected from H, halogen, linear or branched C$_1$-C$_{20}$-alkyl, linear or branched C$_2$-C$_8$-alkenyl, C$_1$-C$_8$-alkoxy, C$_2$-C$_8$-alkenyloxy, C$_3$-C$_8$-cycloalkyl, C$_6$-C$_{12}$-aryl, C$_3$-C$_8$-cycloalkoxy, C$_7$-C$_{12}$-arylalkoxy, C$_9$-C$_{15}$-alkenylarylalkoxy, nitro-, C$_6$-C$_{12}$-arylsulfonyl, 4-alkylarylsulfonyl, C$_1$-C$_{20}$-alkylcarboxy, C$_1$-C$_8$-alkoxycarbonyl, SR$_{12}$, NHR$_{12}$ or NR$_{12}$R$_{13}$ with R$_{12}$ and R$_{13}$ being independently selected from H, linear or branched C$_1$-C$_{20}$-alkyl, linear or branched C$_2$-C$_8$-alkenyl and C$_3$-C$_8$-cycloalkyl, and an O-, S- or N-containing 5- or 6-membered heterocyclic ring; R$_6$ is OSiR$_{14}$R$_{15}$R$_{16}$ with R$_{14}$, R$_{15}$ and R$_{16}$ being independently selected from linear or branched C$_1$-C$_{20}$-alkyl or C$_6$-C$_{12}$-aryl, the process comprising the steps of
a) heating ammonium hypophosphite with a silylating agent for obtaining a bis(silyl ether)phosphine, and
b) reacting the bis(silyl ether)phosphine obtained in step a) with a compound of the general formula IIa and/or IIb,

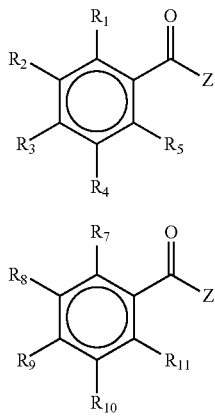

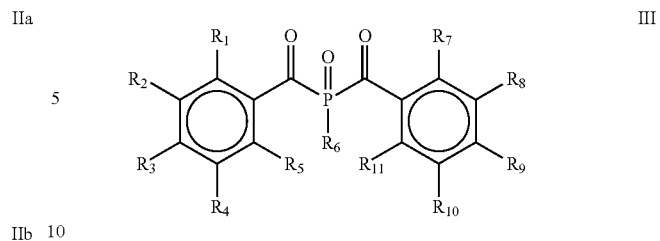

wherein $R_1$, $R_2$, $R_3$, $R_4$ and $R_5$ and/or $R_7$, $R_8$, $R_9$, $R_{10}$ and $R_{11}$ are as defined above; Z is halogen.

2. The process according to claim 1, wherein $R_1$, $R_3$ and $R_5$ and/or $R_7$, $R_9$ and $R_{11}$ are the same.

3. The process according to claim 2, wherein $R_1$, $R_3$ and $R_5$ and/or $R_7$, $R_9$ and $R_{11}$ are the same and are selected from linear or branched $C_1$-$C_{20}$-alkyl.

4. The process according to claim 1, wherein $R_2$ and $R_4$ and/or $R_8$ and $R_{10}$ are the same.

5. The process according to claim 1, wherein $R_2$ and $R_4$ and/or $R_8$ and $R_{10}$ are the same and are H.

6. The process according to claim 1, wherein Z is selected from chloro, bromo and iodo.

7. The process according to claim 1, wherein step a) is carried out under an inert gas atmosphere and/or without the addition of a solvent.

8. The process according to claim 1, wherein the bis(silyl ether)phosphine obtained in step a) is mixed with an organic solvent before process step b) is carried out.

9. The process according to claim 1, wherein the bis(silyl ether)phosphine obtained in step a) is subjected to process step b) without purification and isolation of the silylated product obtained in step a).

10. The process according to claim 1, wherein step a) is carried out at a temperature in the range from 100 to 130° C. and/or step b) is carried out at a temperature in the range from −5 to 50° C.

11. The process according to claim 1, wherein step b) is carried out in that the equivalent weight ratio of the compound of the general formula IIa and/or IIb to the ammonium hypophosphite of step a) [IIa and/or IIb:P-compound] is in the range from 3.5:1 to 1.5:1.

12. The process according to claim 1, wherein process step a) and/or step b) is repeated one or more times.

13. The process according to claim 1, wherein the process comprises a further step c) of hydrolyzing the bis(acyl) phosphinic acid silyl ester obtained in step b) such as to obtain a bis(acyl)phosphinic acid of the general formula III:

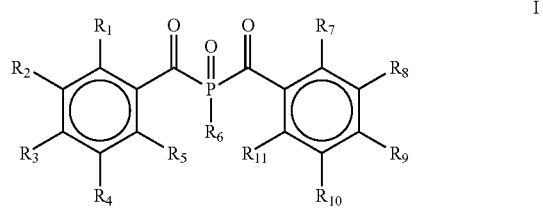

wherein $R_1$, $R_2$, $R_3$, $R_4$, $R_5$, $R_7$, $R_8$, $R_9$, $R_{10}$ and $R_{11}$ are the same or different and are independently selected from H, halogen, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl, $C_6$-$C_{12}$-aryl, $C_3$-$C_8$-cycloalkoxy, $C_7$-$C_{12}$-arylalkoxy, $C_9$-$C_{15}$-alkenylarylalkoxy, nitro-, $C_6$-$C_{12}$-arylsulfonyl, 4-alkylarylsulfonyl, $C_1$-$C_{20}$-alkylcarboxy, $C_1$-$C_8$-alkoxycarbonyl, $SR_{12}$, $NHR_{12}$ or $NR_{12}R_{13}$ with $R_{12}$ and $R_{13}$ being independently selected from H, linear or branched $C_1$-$C_{20}$-alkyl, linear or branched $C_2$-$C_8$-alkenyl and $C_3$-$C_8$-cycloalkyl, and an O-, S- or N-containing 5- or 6-membered heterocyclic ring; $R_6$ is OH.

14. The process according to claim 13, wherein step c) is carried out at a temperature in the range from −5 to 50° C.

15. A bis(acyl)phosphinic acid silyl ester of the general formula I:

wherein $R_1$, $R_2$, $R_3$, $R_4$, $R_5$, $R_7$, $R_8$, $R_9$, $R_{10}$ and $R_{11}$ are the same or different and are independently selected from H, halogen, linear or branched $C_1$-$C_{20}$-alkyl, linear or branched $C_2$-$C_8$-alkenyl, $C_1$-$C_8$-alkoxy, $C_2$-$C_8$-alkenyloxy, $C_3$-$C_8$-cycloalkyl, $C_6$-$C_{12}$-aryl, $C_3$-$C_8$-cycloalkoxy, $C_7$-$C_{12}$-arylalkoxy, $C_9$-$C_{15}$-alkenylarylalkoxy, nitro-, $C_6$-$C_{12}$-arylsulfonyl, 4-alkylarylsulfonyl, $C_1$-$C_{20}$-alkylcarboxy, $C_1$-$C_8$-alkoxycarbonyl, $SR_{12}$, $NHR_{12}$ or $NR_{12}R_{13}$ with $R_{12}$ and $R_{13}$ being independently selected from H, linear or branched $C_1$-$C_{20}$-alkyl, linear or branched $C_2$-$C_8$-alkenyl and $C_3$-$C_8$-cycloalkyl, and an O-, S- or N-containing 5- or 6-membered heterocyclic ring; $R_6$ is $OSiR_{14}R_{15}R_{16}$ with $R_{14}$, $R_{15}$ and $R_{16}$ being independently selected from linear or branched $C_1$-$C_{20}$-alkyl or $C_6$-$C_{12}$-aryl, obtained by a process according to claim 1.

* * * * *